United States Patent
Abotabl et al.

(10) Patent No.: US 12,301,491 B2
(45) Date of Patent: May 13, 2025

(54) CHANNEL STATE INFORMATION REFERENCE SIGNAL PORT MAPPING FOR BASE STATION ANTENNA ADAPTATION

(71) Applicant: QUALCOMM Incorporated, San Diego, CA (US)

(72) Inventors: Ahmed Attia Abotabl, San Diego, CA (US); Hung Dinh Ly, San Diego, CA (US); Muhammad Sayed Khairy Abdelghaffar, San Jose, CA (US); Yongjun Kwak, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 744 days.

(21) Appl. No.: 17/643,103

(22) Filed: Dec. 7, 2021

(65) Prior Publication Data
US 2023/0179353 A1  Jun. 8, 2023

(51) Int. Cl.
*H04L 5/00* (2006.01)
*H04J 13/16* (2011.01)

(52) U.S. Cl.
CPC ............ *H04L 5/0048* (2013.01); *H04J 13/16* (2013.01)

(58) Field of Classification Search
CPC ... H04L 5/0048; H04L 5/0023; H04L 5/0053; H04L 5/0094; H04L 5/005; H04L 1/0026; H04L 5/0016; H04J 13/16; H04B 7/0691; H04W 72/23
See application file for complete search history.

(56) References Cited

U.S. PATENT DOCUMENTS

| | | | |
|---|---|---|---|
| 11,071,125 B2* | 7/2021 | Park | H04W 72/12 |
| 2014/0341114 A1 | 11/2014 | Seo et al. | |
| 2016/0050006 A1* | 2/2016 | Ko | H04B 7/0478 370/329 |
| 2016/0248562 A1* | 8/2016 | Nam | H04L 5/0051 |
| 2018/0152324 A1* | 5/2018 | Park | H04L 25/0224 |

(Continued)

FOREIGN PATENT DOCUMENTS

| | | |
|---|---|---|
| EP | 3311505 A1 | 4/2018 |
| WO | WO-2021168806 A1 | 9/2021 |

OTHER PUBLICATIONS

CATT: "Network Energy Saving Techniques in Time, Frequency, and Spatial Domain", 3GPP TSG RAN WG1 #109-e, R1-2203482, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022 Apr. 29, 2022, XP052153011, 7 Pages, Sect. 2.2.3.

(Continued)

*Primary Examiner* — Mounir Moutaouakil
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may receive an indication of a set of channel state information reference signal (CSI-RS) port mappings for different antenna adaptation levels of a base station. The UE may receive, from the base station, a CSI-RS in accordance with a first CSI-RS port mapping, from the set of CSI-RS port mappings, for a first antenna adaptation level of the different antenna adaptation levels. Numerous other aspects are described.

30 Claims, 13 Drawing Sheets

(56) References Cited

U.S. PATENT DOCUMENTS

| | | | | |
|---|---|---|---|---|
| 2018/0375561 A1* | 12/2018 | Park | ...................... | H04B 7/0456 |
| 2019/0364556 A1* | 11/2019 | Davydov | ................ | H04B 7/088 |
| 2020/0358503 A1* | 11/2020 | Hao | ...................... | H04W 72/23 |
| 2020/0366326 A1* | 11/2020 | Jassal | ........................ | G06N 3/08 |
| 2021/0211166 A1* | 7/2021 | Qiang | .................. | H04B 7/0456 |
| 2022/0408288 A1 | 12/2022 | Yu et al. | | |

OTHER PUBLICATIONS

International Search Report and Written Opinion—PCT/US2022/077010—ISA/EPO—Jan. 20, 2023.

Moderator (Intel Corporation): "Discussion Summary for Energy Saving Techniques of NW Energy Saving SI", 3GPP TSG RAN WG1 Meeting #109-e, R1-2205140, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022 May 9, 2022, XP052191785, 20 Pages, Sect. 2.4.

Qualcomm Incorporated: "Details of CSI Measurement", 3GPP TSG RAN WG1 Meeting 90bis, R1-1718539, 3rd Generation Partnership Project, Mobile Competence Centre, 650, Route Des Lucioles, F-06921 Sophia-Antipolis Cedex, France, vol. RAN WG1, No. Prague, Czech, Oct. 9, 2017-Oct. 13, 2017 Oct. 8, 2017, XP051341721, pp. 1-6, Sect. 2.1.

* cited by examiner

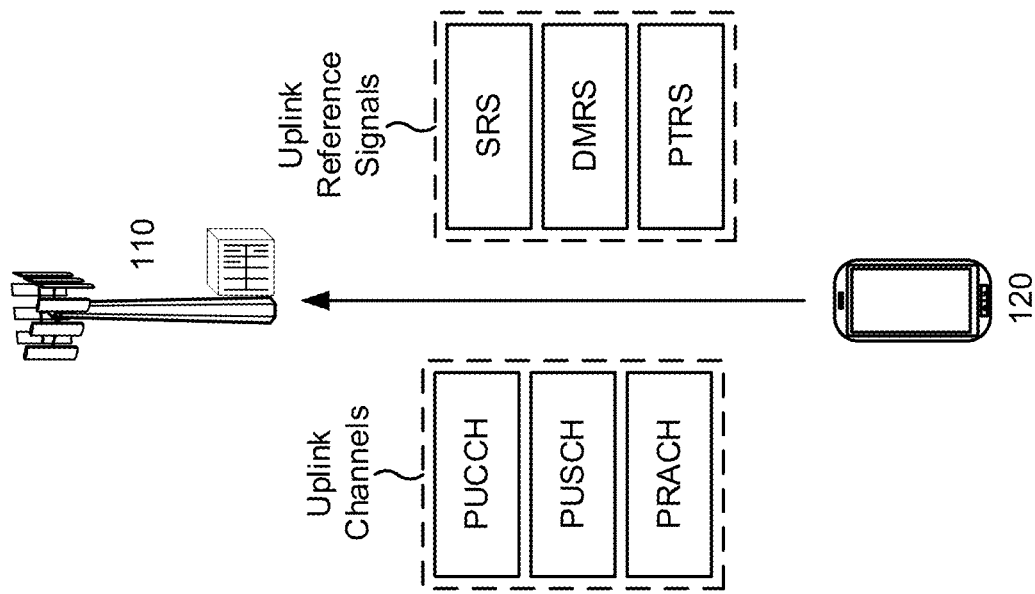
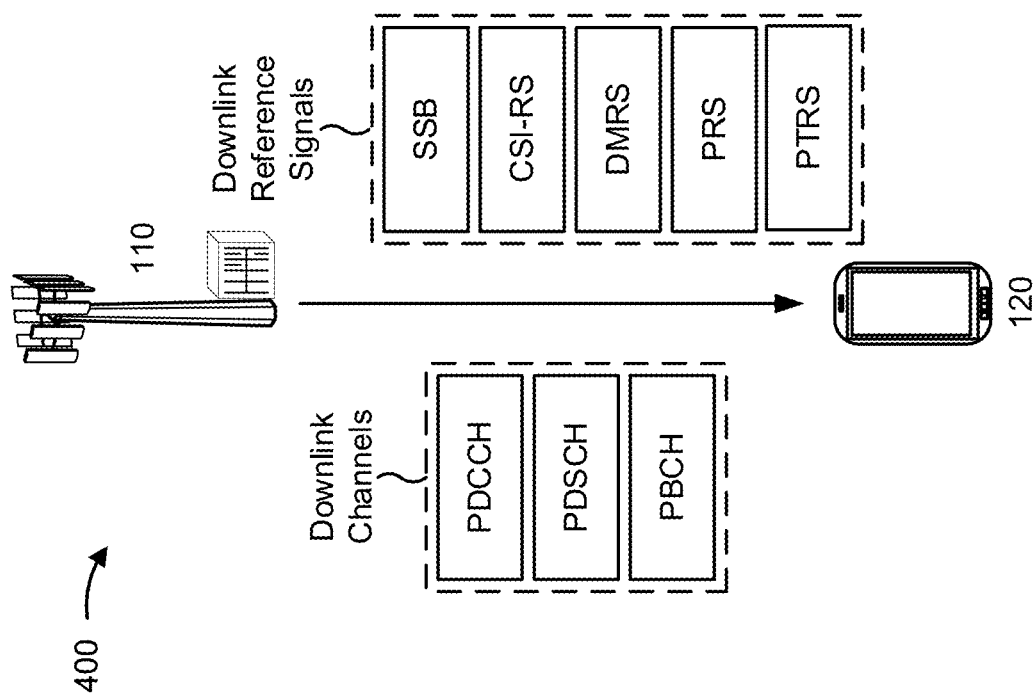
FIG. 4

500 →

| Row | Ports $X$ | Density $\rho$ | cdm-Type | $(\bar{k},\bar{l})$ | CDM group index $j$ | $k'$ | $l'$ |
|---|---|---|---|---|---|---|---|
| 1 | 1 | 3 | No CDM | $(k_0, l_0), (k_0+4, l_0), (k_0+8, l_0)$ | 0,0,0 | 0 | 0 |
| 2 | 1 | 1, 0.5 | No CDM | $(k_0, l_0)$ | 0 | 0 | 0 |
| 3 | 2 | 1 | fd-CDM2 | $(k_0, l_0)$ | 0 | 0, 1 | 0 |
| 4 | 4 | 1 | fd-CDM2 | $(k_0, l_0), (k_0+2, l_0)$ | 0,1 | 0, 1 | 0 |
| 5 | 4 | 1 | fd-CDM2 | $(k_0, l_0), (k_0, l_0+1)$ | 0,1 | 0, 1 | 0 |
| 6 | 8 | 1 | fd-CDM2 | $(k_0, l_0), (k_1, l_0), (k_2, l_0), (k_3, l_0)$ | 0,1,2,3 | 0, 1 | 0 |
| 7 | 8 | 1 | fd-CDM2 | $(k_0, l_0), (k_1, l_0), (k_0, l_0+1), (k_1, l_0+1)$ | 0,1,2,3 | 0, 1 | 0 |
| 8 | 8 | 1 | cdm4-FD2-TD2 | $(k_0, l_0), (k_1, l_0)$ | 0,1 | 0, 1 | 0, 1 |
| 9 | 12 | 1 | fd-CDM2 | $(k_0, l_0), (k_1, l_0), (k_2, l_0), (k_3, l_0), (k_4, l_0), (k_5, l_0)$ | 0,1,2,3,4,5 | 0, 1 | 0 |
| 10 | 12 | 1 | cdm4-FD2-TD2 | $(k_0, l_0), (k_1, l_0), (k_2, l_0)$ | 0,1,2 | 0, 1 | 0, 1 |
| 11 | 16 | 1, 0.5 | fd-CDM2 | $(k_0, l_0), (k_1, l_0), (k_2, l_0), (k_3, l_0), (k_0, l_0+1), (k_1, l_0+1), (k_2, l_0+1), (k_3, l_0+1)$ | 0,1,2,3,4,5,6,7 | 0, 1 | 0 |
| 12 | 16 | 1, 0.5 | cdm4-FD2-TD2 | $(k_0, l_0), (k_1, l_0), (k_2, l_0), (k_3, l_0)$ | 0,1,2,3 | 0, 1 | 0, 1 |
| 13 | 24 | 1, 0.5 | fd-CDM2 | $(k_0, l_0), (k_1, l_0), (k_2, l_0), (k_0, l_0+1), (k_1, l_0+1), (k_2, l_0+1), (k_0, l_1), (k_1, l_1), (k_2, l_1), (k_0, l_1+1), (k_1, l_1+1), (k_2, l_1+1)$ | 0,1,2,3,4,5,6,7,8,9,10,11 | 0, 1 | 0 |
| 14 | 24 | 1, 0.5 | cdm4-FD2-TD2 | $(k_0, l_0), (k_1, l_0), (k_2, l_0), (k_0, l_1), (k_1, l_1), (k_2, l_1)$ | 0,1,2,3,4,5 | 0, 1 | 0, 1 |
| 15 | 24 | 1, 0.5 | cdm8-FD2-TD4 | $(k_0, l_0), (k_1, l_0), (k_2, l_0)$ | 0,1,2 | 0, 1 | 0, 1, 2, 3 |
| 16 | 32 | 1, 0.5 | fd-CDM2 | $(k_0, l_0), (k_1, l_0), (k_2, l_0), (k_3, l_0), (k_0, l_0+1), (k_1, l_0+1), (k_2, l_0+1), (k_3, l_0+1), (k_0, l_1), (k_1, l_1), (k_2, l_1), (k_3, l_1), (k_0, l_1+1), (k_1, l_1+1), (k_2, l_1+1), (k_3, l_1+1)$ | 0,1,2,3,4,5,6,7,8,9,10,11,12,13,13,15 | 0, 1 | 0 |
| 17 | 32 | 1, 0.5 | cdm4-FD2-TD2 | $(k_0, l_0), (k_1, l_0), (k_2, l_0), (k_3, l_0), (k_0, l_1), (k_1, l_1), (k_2, l_1), (k_3, l_1)$ | 0,1,2,3,4,5,6,7 | 0, 1 | 0, 1 |
| 18 | 32 | 1, 0.5 | cdm8-FD2-TD4 | $(k_0, l_0), (k_1, l_0), (k_2, l_0), (k_3, l_0)$ | 0,1,2,3 | 0, 1 | 0, 1, 2, 3 |

FIG. 5A

CHANNEL STATE INFORMATION REFERENCE SIGNAL PORT MAPPING FOR BASE STATION ANTENNA ADAPTATION

FIELD OF THE DISCLOSURE

Aspects of the present disclosure generally relate to wireless communication and to techniques and apparatuses for channel state information (CSI) reference signal port (CSI-RS) port mapping for base station antenna adaptation.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive an indication of a set of channel state information reference signal (CSI-RS) port mappings for different antenna adaptation levels of a base station. The one or more processors may be configured to receive, from the base station, a CSI-RS in accordance with a first CSI-RS port mapping, from the set of CSI-RS port mappings, for a first antenna adaptation level of the different antenna adaptation levels.

Some aspects described herein relate to a method of wireless communication performed by a UE. The method may include receiving an indication of a set of CSI-RS port mappings for different antenna adaptation levels of a base station. The method may include receiving, from the base station, a CSI-RS in accordance with a first CSI-RS port mapping, from the set of CSI-RS port mappings, for a first antenna adaptation level of the different antenna adaptation levels.

Some aspects described herein relate to a non-transitory computer-readable medium that stores a set of instructions for wireless communication by a UE. The set of instructions, when executed by one or more processors of the UE, may cause the UE to receive an indication of a set of CSI-RS port mappings for different antenna adaptation levels of a base station. The set of instructions, when executed by one or more processors of the UE, may cause the UE to receive, from the base station, a CSI-RS in accordance with a first CSI-RS port mapping, from the set of CSI-RS port mappings, for a first antenna adaptation level of the different antenna adaptation levels.

Some aspects described herein relate to an apparatus for wireless communication. The apparatus may include means for receiving an indication of a set of CSI-RS port mappings for different antenna adaptation levels of a base station. The apparatus may include means for receiving, from the base station, a CSI-RS in accordance with a first CSI-RS port mapping, from the set of CSI-RS port mappings, for a first antenna adaptation level of the different antenna adaptation levels.

Some aspects described herein relate to a base station for wireless communication. The base station may include a memory and one or more processors coupled to the memory. The one or more processors may be configured to transmit, to a UE, an indication of a set of CSI-RS port mappings for different antenna adaptation levels of the base station. The one or more processors may be configured to transmit, to the UE, a CSI-RS in accordance with a first CSI-RS port mapping, from the set of CSI-RS port mappings, for a first adaptation level of the different antenna adaptation levels.

Some aspects described herein relate to a method of wireless communication performed by a base station. The method may include transmitting, to a UE, an indication of a set of CSI-RS port mappings for different antenna adaptation levels of the base station. The method may include transmitting, to the UE, a CSI-RS in accordance with a first CSI-RS port mapping, from the set of CSI-RS port mappings, for a first adaptation level of the different antenna adaptation levels.

Some aspects described herein relate to a non-transitory computer-readable medium that stores a set of instructions for wireless communication by a base station. The set of instructions, when executed by one or more processors of the base station, may cause the base station to transmit, to a UE, an indication of a set of CSI-RS port mappings for different antenna adaptation levels of the base station. The set of instructions, when executed by one or more processors of the base station, may cause the base station to transmit, to the UE, a CSI-RS in accordance with a first CSI-RS port mapping, from the set of CSI-RS port mappings, for a first adaptation level of the different antenna adaptation levels.

Some aspects described herein relate to an apparatus for wireless communication. The apparatus may include means for transmitting, to a UE, an indication of a set of CSI-RS port mappings for different antenna adaptation levels of the apparatus. The apparatus may include means for transmitting, to the UE, a CSI-RS in accordance with a first CSI-RS port mapping, from the set of CSI-RS port mappings, for a first adaptation level of the different antenna adaptation levels.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of physical channels and reference signals in a wireless network, in accordance with the present disclosure.

FIGS. 5A and 5B are diagrams illustrating an example of a channel state information reference signal (CSI-RS) port mapping, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
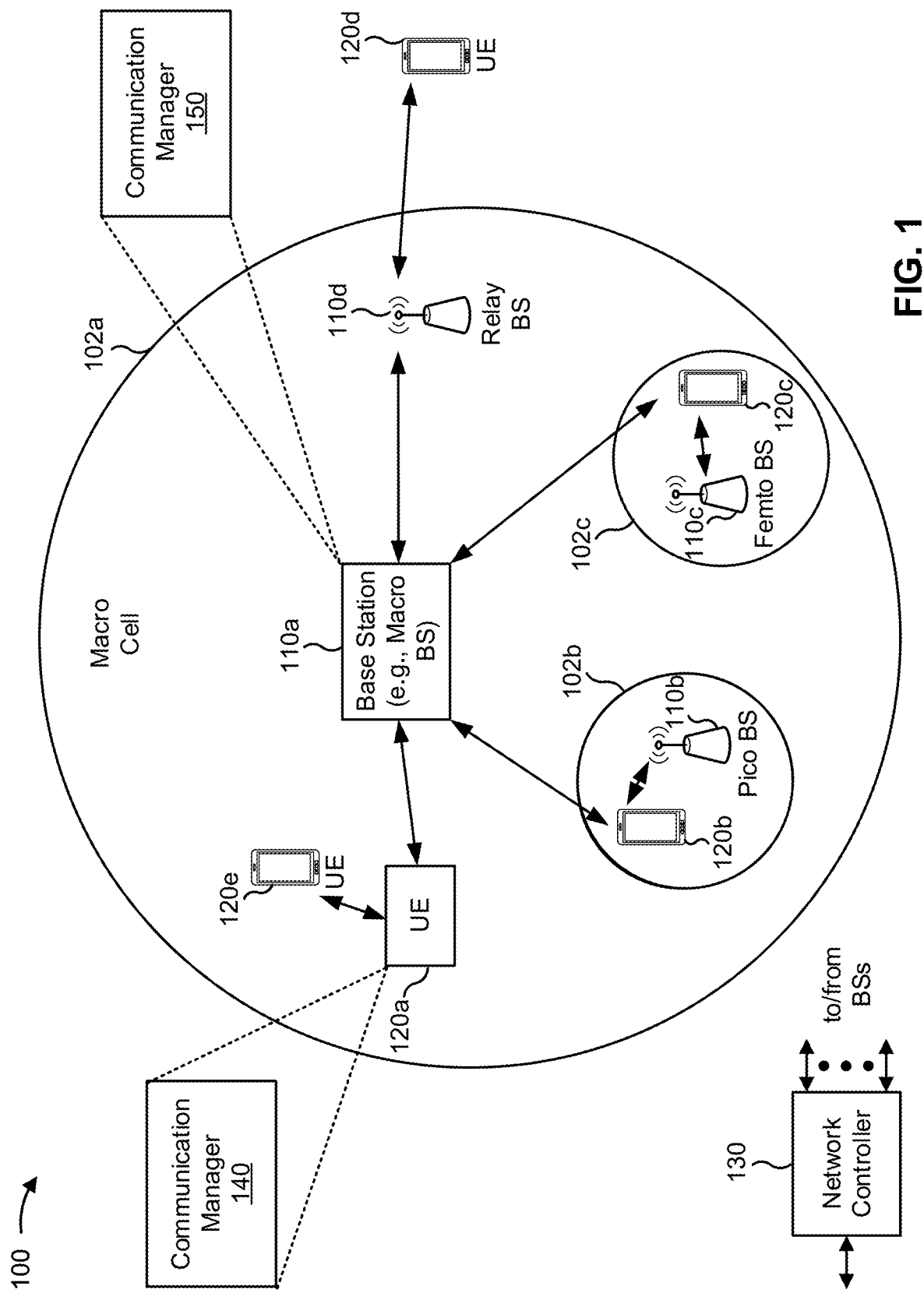
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of a set of channel state information reference signal (CSI-RS) port mappings for different antenna adaptation levels of a base station; and receive, from the base station, a CSI-RS in accordance with a first CSI-RS port mapping, from the set of CSI-RS port mappings, for a first antenna adaptation level of the different antenna adaptation levels. Additionally, or alternatively, the communication manager 140 may perform one or more other operations described herein.

In some aspects, the base station 110 may include a communication manager 150. As described in more detail elsewhere herein, the communication manager 150 may transmit, to a UE, an indication of a set of CSI-RS port mappings for different antenna adaptation levels of the base station; and/or transmit, to the UE, a CSI-RS in accordance with a first CSI-RS port mapping, from the set of CSI-RS port mappings, for a first adaptation level of the different antenna adaptation levels. Additionally, or alternatively, the communication manager 150 may perform one or more other operations described herein.

As indicated above, FIG. 1 is provided as an example. Other examples may differ from what is described with regard to FIG. 1.

Figure 2:
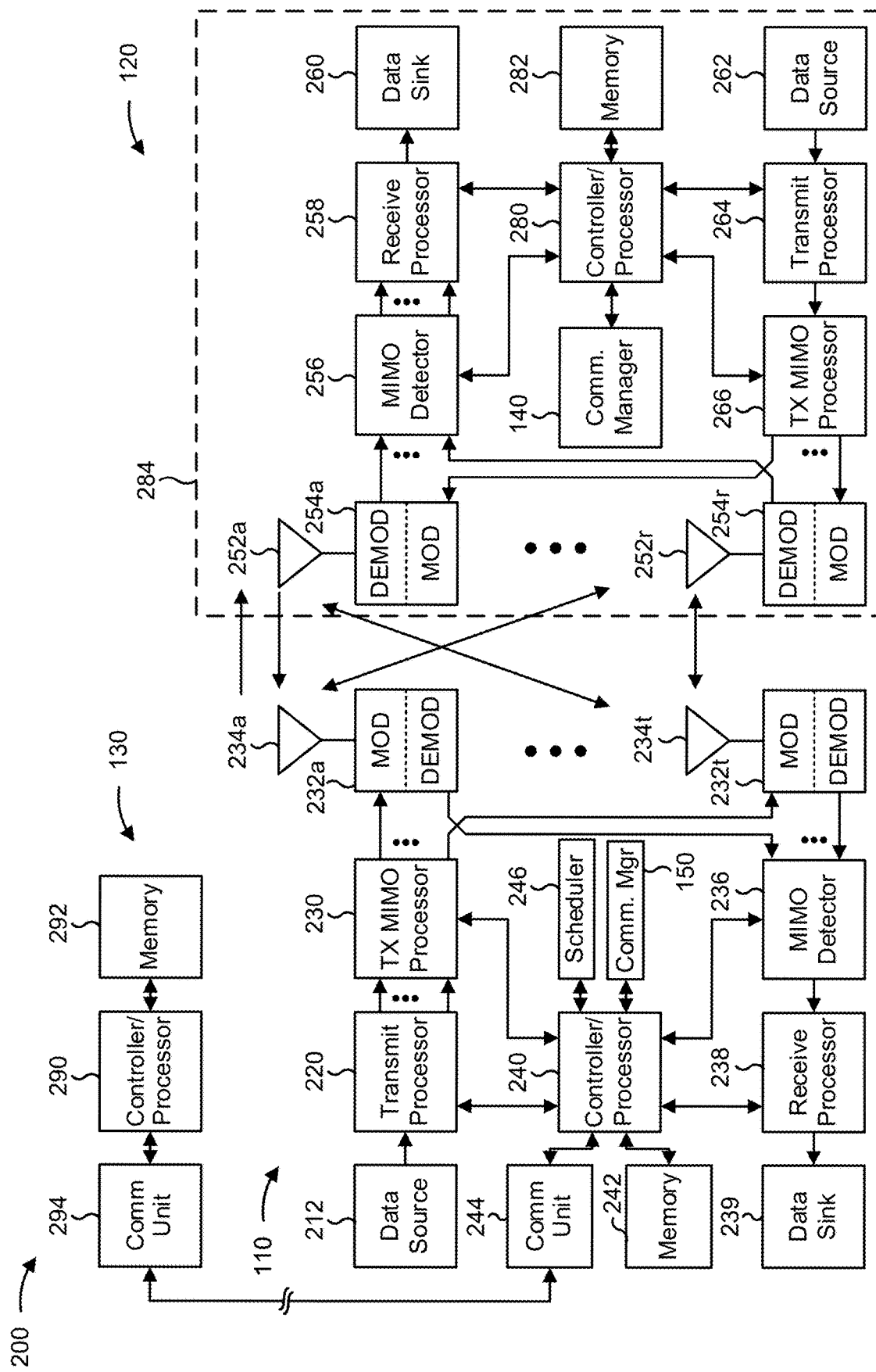
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the base station 110, controller/processor 280 of the UE 120, and/or any other component(s) of FIG. 2 may perform one or more techniques associated with CSI-RS port mapping for base station antenna adaptation, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving an indication of a set of CSI-RS port mappings for different antenna adaptation levels of a base station; and/or means for receiving, from the base station, a CSI-RS in accordance with a first CSI-RS port mapping, from the set of CSI-RS port mappings, for a first antenna adaptation level of the different antenna adaptation levels. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, an indication of a set of CSI-RS port mappings for different antenna adaptation levels of the base station; and/or means for transmitting, to the UE, a CSI-RS in accordance with a first CSI-RS port mapping, from the set of CSI-RS port mappings, for a first adaptation level of the different antenna adaptation levels. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
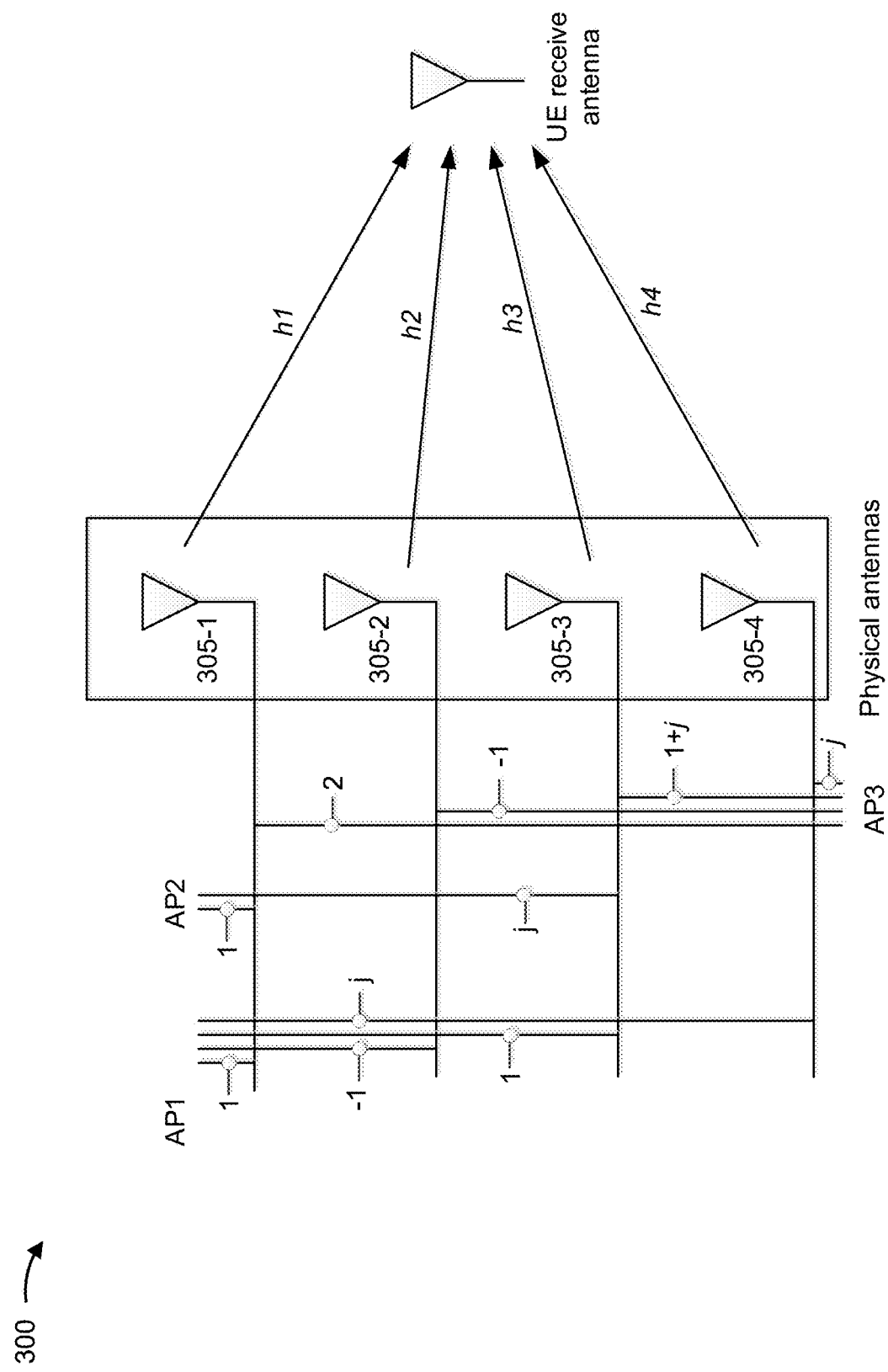
FIG. 3 is a diagram illustrating an example of antenna ports, in accordance with the present disclosure.

FIG. 3 is a diagram illustrating an example 300 of antenna ports, in accordance with the present disclosure.

As shown in FIG. 3, a first physical antenna 305-1 may transmit information via a first channel h1, a second physical antenna 305-2 may transmit information via a second channel h2, a third physical antenna 305-3 may transmit information via a third channel h3, and a fourth physical antenna 305-4 may transmit information via a fourth channel h4. Such information may be conveyed via a logical antenna port, which may represent some combination of the physical antennas and/or channels. In some cases, a UE 120 may not have knowledge of the channels associated with the physical antennas, and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 300, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and "precoder" may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

A base station may include antennas and antenna ports in a similar manner as described above. In some examples, a base station may include a larger quantity of physical antennas than a quantity of physical antennas associated with a UE. In some examples, antenna ports used by the base station may be indicated to a UE (e.g., in a radio resource control (RRC) configuration).

As indicated above, FIG. 3 is provided merely as an example. Other examples may differ from what is described with regard to FIG. 3.

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a CSI-RS, a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. In some examples, as part of the configuration for the CSI-RSs, the base station 110 may configure a CSI-RS port mapping that indicates CSI-RS ports used by the base station 110. As used herein, "CSI-RS port" may refer to an antenna port, of the base station, used to transmit a CSI-RS. The CSI-RS port mapping may map the CSI-RS ports to time-frequency resource locations. Based at least in part on the measurements of the CSI-RSs, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5B:
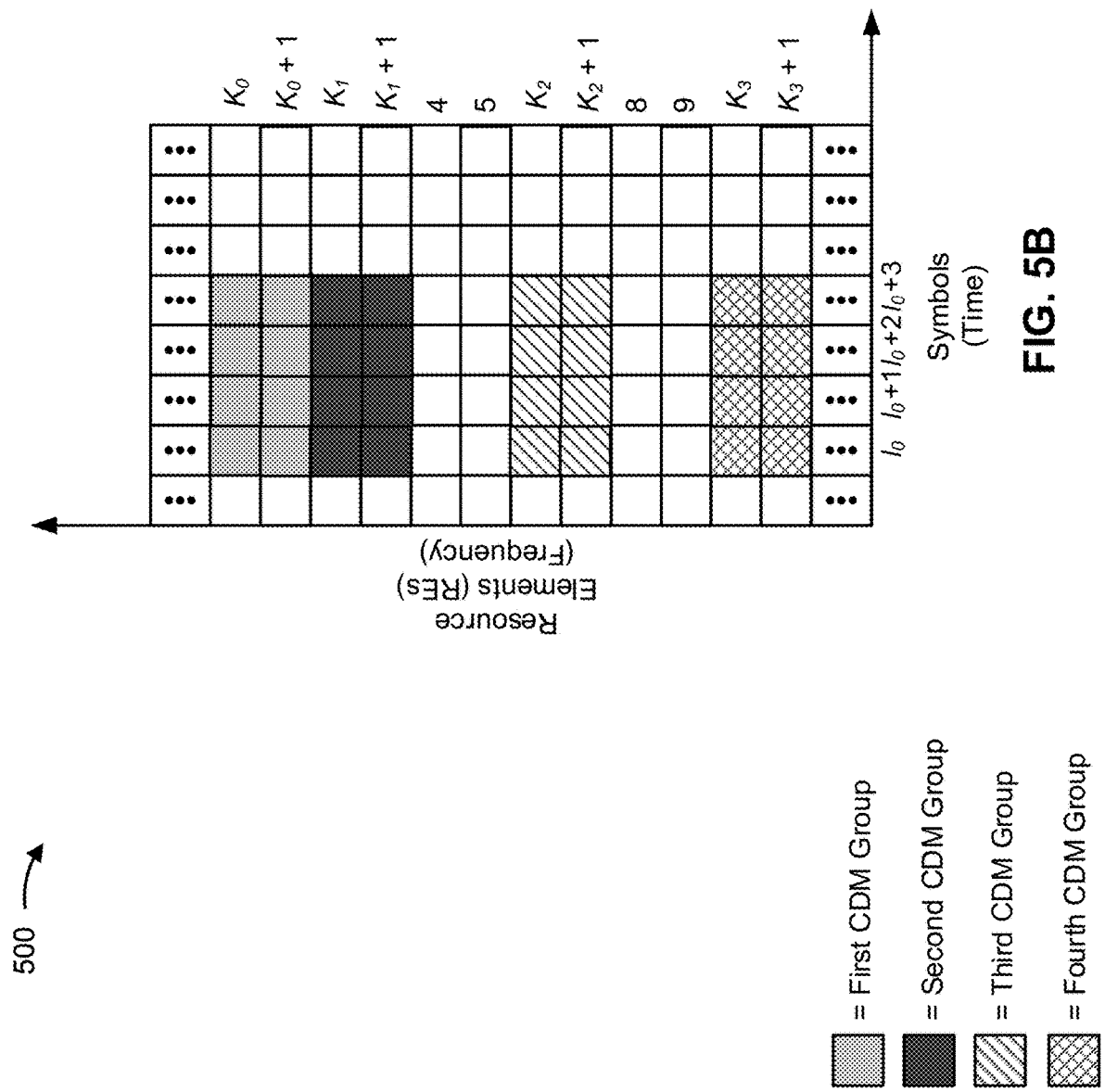

FIGS. 5A and 5B are diagrams illustrating an example 500 of a CSI-RS port mapping, in accordance with the present disclosure. The CSI-RS port mapping may also be referred to as a CSI-RS resource mapping. As shown in FIG. 5, time-frequency resources in a radio access network may be partitioned into resource blocks (RBs). An RB is sometimes referred to as a physical resource block (PRB). An RB includes a set of subcarriers (e.g., 12 subcarriers) and a set of symbols (e.g., 14 symbols) that are schedulable by a base station 110 as a unit. In some examples, an RB may include a set of subcarriers in a single slot. A single time-frequency resource included in an RB may be referred to as a resource element (RE). An RE may include a single subcarrier (e.g., in frequency) and a single symbol (e.g., in time). A symbol may be referred to as an orthogonal frequency division multiplexing (OFDM) symbol. An RE may be used to transmit one modulated symbol, which may be a real value or a complex value.

A CSI-RS may be based at least in part on a pseudo random sequence. For each CSI-RS that is configured, a UE may assume that a sequence is mapped to one or more REs. The mapping may be based at least in part on one or more parameters indicated by a CSI configuration (e.g., a CSI-RS-ResourceMapping information element (IE)) and/or another RRC configuration. The mapping of CSI-RS sequences to REs (e.g., to time-frequency resources) may be defined, or otherwise fixed, by a wireless communication standard, such as the 3GPP (e.g., 3GPP Technical Specification 38.211 Version 16.7.0 may define the mapping of CSI-RS sequences to REs). For example, as shown in FIG. 5A, the mapping may be based at least in part on a number of configured CSI-RS ports (e.g., which may be referred to as "Ports X"), a density ($\rho$), a code division multiplex (CDM) type, one or more time domain and frequency domain locations (e.g., for a CDM group) (e.g., which may be referred to as ($\bar{k}$, $\bar{l}$), where k is a frequency domain resource location reference point and l is a time domain resource location reference point), a CDM group index (j), a frequency domain index within a CDM group (k'), and/or a time domain index within a CDM group (l'), among other examples. For example, 3GPP Technical Specification 38.211 provides a table with different entries (e.g., identified by a row index value) defining different CSI-RS resource locations for different values of the parameters described above.

The number of configured CSI-RS ports (e.g., Ports X) may be given by a higher layer (e.g., RRC) parameter, such as an nrofPorts parameter in a CSI-RS-ResourceMapping IE. The number of configured CSI-RS ports may be a number of CSI-RS ports configured for (e.g., available for use) by the base station 110. The density (p) may be given by a higher layer (e.g., RRC) parameter, such as a density parameter in the CSI-RS-ResourceMapping IE or in a CSI-RS-CellMobility IE. The density may indicate a quantity of CSI-RSs that are transmitted per-RB. For example, a density of 1 may indicate that 1 CSI-RS is transmitted in each RB. A density of 0.5 may indicate that 1 CSI-RS is transmitted in every other RB (e.g., every 2 RBs).

The CDM types may indicate a pattern associated with CDM groups associated with the CSI-RS transmission. For example, in a wireless communication system, multiple CSI-RS ports can be used to transmit on the same OFDM symbol using CDM and frequency division multiplexing (FDM). Using FDM, different CSI-RS ports can be used for transmission of CSI-RSs on the same OFDM symbol by using different sub-carriers (e.g., tones or REs) for different CSI-RS ports. Using CDM, different CSI-RS ports can be used for transmission of CSI-RSs on the same OFDM symbol (or across a set of OFDM symbols on the same subcarrier) by using different orthogonal cover codes (OCCs) for different CSI-RS ports. The CSI-RS ports that are used for transmission on the same sub-carrier belong to the same CDM group, and the CSI-RS ports that are used for transmission on different sub-carriers belong to different CDM groups. In other words, a CDM group includes a set of CSI-RS ports used for transmission of a respective set of CSI-RSs on the same sub-carrier, where different OCCs are used for (e.g., to scramble) transmissions on different CSI-RS ports included in the set of CSI-RS ports.

The one or more time domain and frequency domain locations (e.g., for a CDM group) (($\bar{k}$, $\bar{l}$)) may provide starting locations for each CDM group in the time domain ($\bar{l}$) and the frequency domain ($\bar{k}$) for each CDM group associated with the CSI-RS transmission. A reference point for k=0 may be a subcarrier with an index value of "0" in common RB 0. Different $\bar{k}$ values (e.g., $k_0$, $k_1$, $k_2$, and/or $k_3$) may be provided by a frequency domain resource allocation (e.g., a frequencyDomainAllocation parameter) in the CSI-RS-ResourceMapping IE or a CSI-RS-ResourceConfigMobility IE. Different $\bar{l}$ values (e.g., $l_0$, and/or $l_1$) may be provided by a higher layer (e.g., RRC) parameter indicating a first OFDM symbol in the time domain for a CSI-RS (e.g., by a firstOFDMSymbolInTimeDomain parameter (e.g., for $l_0$) or a firstOFDMSymbolInTimeDomain2 parameter (e.g., for $l_1$) in the CSI-RS-ResourceMapping IE or the CSI-RS-ResourceConfigMobility IE). The frequency domain index within a CDM group (k') and the time domain index within a CDM group (l') may provide RE indices for a given CDM group (e.g., relative to the $\bar{k}$, $\bar{l}$ values).

FIG. 5B depicts a CSI-RS resource mapping associated with 32 CSI-RS ports (e.g., a Ports X value of 32) and 4

CDM groups (e.g., a first CDM group, a second CDM group, a third CDM group, and a fourth CDM group). For example, the example 500 may depict a CSI-RS resource mapping corresponding to row 18 of the table depicted in FIG. 5A (e.g., the Table 7.3.1.5.3-1 in 3GPP Technical Specification 38.211 Version 16.7.0. For example, the example 500 may be associated with a Ports X value of 32, a density of 1 or 0.5, a CDM type of cdm8-FD2-TD4, and $\bar{k}$, $\bar{l}$ values of ($k_0$, $l_0$) (e.g., for the first CDM group), ($k_1$, $l_0$) (e.g., for the second CDM group), ($k_2$, $l_0$) (e.g., for the third CDM group), and ($k_3$, $l_0$) (e.g., for the fourth CDM group). The example 500 may be associated with k' values of 0 and 1 (e.g., indicating that each CDM group includes an RE with index $\bar{k}$ and an RE with index $\bar{k}$+1. The example 500 may be associated with l' values of 0, 1, 2, and 3 (e.g., indicating that each CDM group includes an RE with index $\bar{l}$, $\bar{l}$+1, $\bar{l}$+2, and $\bar{l}$+3). Based at least in part on the higher layer parameters configured for the CSI-RS, a UE may identify the CSI-RS time-frequency locations (e.g., in a similar manner as described above).

A single CSI-RS port may be mapped to each RE associated with the CSI-RS. For example, the base station 110 may sound (e.g., transmit using) a CSI-RS port at the RE associated with the CSI-RS port. For example, example 500 includes 32 REs that are associated with the CSI-RS. Each of the 32 REs may be associated with a single CSI-RS port (e.g., one of the 32 configured CSI-RS ports, as indicated by the nrofPorts parameter). The UE may monitor and/or measure the REs (e.g., the time-frequency locations) associated with the CSI-RS.

As indicated above, FIGS. 5A and 5B are provided as examples. Other examples may differ from what is described with regard to FIG. 5.

Figure 6:
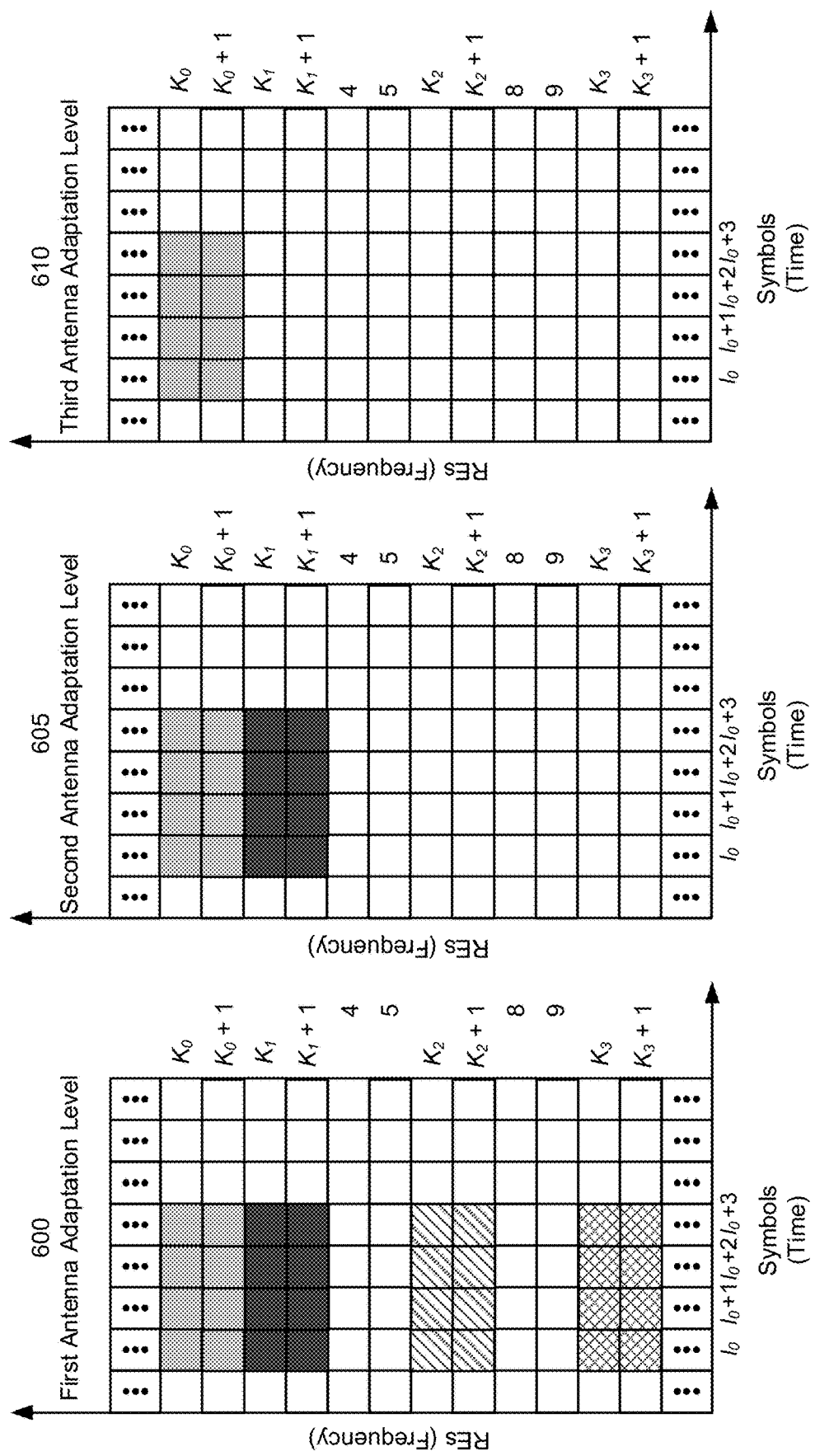
FIG. 6 is a diagram illustrating examples of antenna adaptation, in accordance with the present disclosure.

FIG. 6 is a diagram illustrating examples 600, 605, 610 of antenna adaptation, in accordance with the present disclosure. As used herein, "antenna adaptation" may refer to dynamically changing a quantity of ports (e.g., CSI-RS ports) that are used by a base station for communication from among a quantity of ports (e.g., CSI-RS ports) that are configured for or available for use by the base station. For example, the base station may indicate a quantity of ports (e.g., a quantity of CSI-RS ports (Ports X), such as in the nrofPorts parameter) that are available for use by the base station, such as in an RRC configuration. In some cases, the base station may transmit using all of the configured ports or less than all of the configured ports. "Antenna adaptation" may also be referred to as "panel adaptation" or "antenna panel adaptation." For example, the base station may dynamically adapt a quantity of antenna panels used by the base station in a similar manner as described herein.

For example, as a bandwidth used by wireless networks increases, a quantity of antennas at a base station may also increase to enable the base station to serve a larger bandwidth. However, using a large quantity of antennas (e.g., 64 antenna ports) may consume significant power at the base station. Therefore, in some cases, it may be desirable for the base station to use fewer antennas than are configured for use to conserve power. However, using fewer antennas may degrade communication performance for UEs being served by the base station. Therefore, the base station may use fewer antennas in certain circumstances (e.g., circumstances in which using fewer antennas does not, or does not significantly, degrade communication performance for UEs being served by the base station). For example, based at least in part on a network load (e.g., a quantity of UEs being served by the base station or an amount of uplink or downlink traffic being communicated by the base station), the base station may dynamically adapt a quantity of antennas (e.g., a quantity of antenna ports) used by the base station for transmissions (e.g., to conserve power). For example, when a network load decreases, the base station may use fewer antenna ports, and when the network load increases, the base station may use more antenna ports. The dynamic adaptation of the quantity of antennas (e.g., a quantity of antenna ports) used by the base station may be referred to herein as a base station applying antenna adaptation. The base station may use dynamic adaptation (e.g., rather than reconfiguring the quantity of antenna ports that are available for use by the base station, such as in an RRC configuration) because the conditions that enable the base station to apply antenna adaptation may change dynamically or rapidly over time. Reconfiguring the quantity of antenna ports that are available for use by the base station (e.g., in an RRC configuration) may be associated with significant delays (e.g., due to the signaling associated with the reconfiguration), which may result in different conditions existing when the reconfiguration is complete than when the reconfiguration was initiated. Therefore, the base station may use dynamic antenna adaptation to ensure that the quantity of antenna ports used by the base station is based on current network conditions or current network loads.

FIG. 6 depicts different antenna adaptation levels that may be applied by a base station. As used herein, "an antenna adaptation level" may refer to an indication of a quantity of antenna ports (e.g., CSI-RS ports) that are used by a base station relative to a quantity of antenna ports (e.g., CSI-RS ports) that are configured for use, or are available, at the base station. The different antenna adaptation levels in FIG. 6 are depicted with reference to a CSI-RS resource mapping (e.g., the CSI-RS resource mapping depicted in FIG. 5). For example, when using a first antenna adaption level 600, the base station may use all of the configured antenna ports. For example, FIG. 6 depicts an example in which the base station has configured 32 CSI-RS ports to be available. When using the first antenna adaption level 600, the base station may transmit using all 32 CSI-RS ports. In other words, the first antenna adaption level 600 may indicate that the antenna ports (e.g., CSI-RS ports) used by the base station are all (e.g., 100%) of the configured antenna ports (e.g., of the configured CSI-RS ports).

When using a second antenna adaption level 605, the base station may use less than all of the configured antenna ports. For example, when using the second antenna adaption level 605, the base station may transmit using 16 CSI-RS ports of the 32 configured CSI-RS ports. In other words, the second antenna adaption level 605 may indicate that the antenna ports (e.g., CSI-RS ports) used by the base station are half (e.g., 50%) of the configured antenna ports (e.g., of the configured CSI-RS ports). For example, as shown in FIG. 6, the base station may not transmit CSI-RS ports corresponding to REs included in the third CDM group and the fourth CDM group.

When using a third antenna adaption level 610, the base station may use less than all of the configured antenna ports. For example, when using the third antenna adaption level 610, the base station may transmit using 8 CSI-RS ports of the 32 configured CSI-RS ports. In other words, the third antenna adaption level 610 may indicate that the antenna ports (e.g., CSI-RS ports) used by the base station are a quarter (e.g., 25%) of the configured antenna ports (e.g., of the configured CSI-RS ports). For example, as shown in FIG. 6, the base station may not transmit CSI-RS ports corresponding to REs included in the second CDM group, the third CDM group, and the fourth CDM group.

The first antenna adaption level 600, the second antenna adaption level 605, and the third antenna adaption level 610 are provided as examples, and other antenna adaptation levels are possible. For example, the base station may transmit using three-quarters (e.g., 75%) of the configured antenna ports (e.g., of the configured CSI-RS ports). In some examples, different antenna adaptation levels may correspond to a quantity of antenna panels used by the base station. For example, the second antenna adaptation level 605 may be associated with the base station using half of the antenna panels of the base station. Antenna adaptation may be similar applied to other CSI-RS resource and/or port mappings in a similar manner as described herein.

However, some (or all) UEs being served by the base station may be unaware of the dynamic antenna adaptation applied by the base station. In other words, UEs may assume that all of the configured antenna ports (e.g., all of the configured CSI-RS ports) are used by the base station for all transmissions (e.g., for all CSI-RS transmissions). As a result, UEs may interpret CSI-RS port and/or resource mapping by inferring that all of the configured antenna ports (e.g., all of the configured CSI-RS ports) are used by the base station. In cases where the base station applies an antenna adaptation level that results in fewer than all of the configured antenna ports (e.g., all of the configured CSI-RS ports) being used by the base station, this may result in the UE monitoring and/or measuring REs that are not sounded by the base station. For example, when using the second antenna adaption level 605, the base station may not sound (e.g., may not transmit using) REs included in the third CDM group and the fourth CDM group. However, because the configured quantity of CSI-RS ports remains the same (e.g., remains 32) when the base station uses the second antenna adaption level 605, a UE may incorrectly determine CSI-RS resource locations indicating that the base station is to transmit using the REs included in the third CDM group and the fourth CDM group. This may result in the UE monitoring and measuring the REs included in the third CDM group and the fourth CDM group, which may result in the UE monitoring and measuring noise with the assumption that the noise is a transmitted CSI-RS. Therefore, the UE may report inaccurate information, for channel state information (CSI), to the base station because the UE measured noise in one or more REs with the assumption that a CSI-RS sequence was transmitted in the one or more REs. Reporting inaccurate information for CSI may negatively impact performance for the UE and/or scheduling determinations by the base station, among other examples.

Some techniques and apparatuses described herein enable CSI-RS port mapping for base station antenna adaptation. For example, a base station may transmit, and a UE may receive, an indication of a set of CSI-RS port mappings for different antenna adaptation levels of the base station. Alternatively, the UE may receive the indication of a set of CSI-RS port mappings for different antenna adaptation levels of the base station based at least in part on pre-configured or pre-defined information. The base station may transmit, and the UE may receive, a CSI-RS in accordance with a first CSI-RS port mapping, from the set of CSI-RS port mappings, for a first antenna adaptation level of the different antenna adaptation levels. As a result, the UE may be enabled to identify a CSI-RS port mapping for the CSI-RS when the base station dynamically applies antenna adaptation (e.g., when the base station does not reconfigure the number of antenna ports or CSI-RS ports available, or configured, for use by the base station). Therefore, the UE may be enabled to correctly identify time-frequency locations of the CSI-RS. This enables the UE to correctly monitor for and measure the CSI-RS (e.g., when the base station is applying antenna adaptation). As a result, an accuracy and/or efficiency of CSI measurements performed by the UE may be improved. Additionally, enabling the UE to correctly monitor for and measure the CSI-RS may improve performance for the UE and/or scheduling determinations by the base station by improving the accuracy of CSI reported by the UE. Moreover, this may enable the base station to efficiently use antenna adaptation (e.g., without degrading a performance of UEs within the wireless network), thereby enabling the base station to conserve power.

In some aspects, the first CSI-RS port mapping, associated with the first antenna adaptation level, may indicate one or more CSI-RS resources that are to be dropped relative to a second CSI-RS port mapping, associated with a second antenna adaptation level. The first CSI-RS port mapping and the second CSI-RS port mapping may be associated with the same quantity of ports at the base station (e.g., a number of configured ports (Ports X)), the same density, and the same CDM type. In some aspects, the first CSI-RS port mapping, associated with the first antenna adaptation level, may indicate that signals transmitted, by the base station, via one or more antenna ports are to be repeated using time-frequency resources associated with other antenna ports as indicated by the second CSI-RS port mapping associated with a second antenna adaptation level. This may enable UEs that do not receive, or are unable to interpret or decode, the indication of the set of CSI-RS port mappings for different antenna adaptation levels of the base station to receive and measure CSI-RSs in the time-frequency resources associated with other antenna ports as indicated by the second CSI-RS port mapping.

For example, UEs that do not receive, or are unable to interpret or decode, the indication of the set of CSI-RS port mappings for different antenna adaptation levels of the base station may determine that the CSI-RS port mapping is the second CSI-RS port mapping (e.g., because the second CSI-RS port mapping is associated with the same quantity of ports at the base station (e.g., Ports X), the same density, and the same CDM type as the first CSI-RS port mapping). Therefore, when the base station applies the first antenna adaptation level and uses the first CSI-RS port mapping, those UEs may still interpret the CSI-RS port mapping for the CSI-RS as the second CSI-RS port mapping. Therefore, by repeating signals transmitted via some CSI-RS ports using the time-frequency resources associated with other antenna ports as indicated by the second CSI-RS port mapping, the base station may transmit CSI-RSs in the time-frequency resources that are being monitored and/or measured by the UEs that do not receive, or are unable to interpret or decode, the indication of the set of CSI-RS port mappings for different antenna adaptation levels. This may improve an accuracy of CSI measurements performed by those UEs because those UEs are enabled to measure CSI-RSs in the time-frequency resources associated with other antenna ports as indicated by the second CSI-RS port mapping (e.g., rather than measuring noise).

As indicated above, FIG. 6 is provided as an example. Other examples may differ from what is described with regard to FIG. 6.

Figure 7:
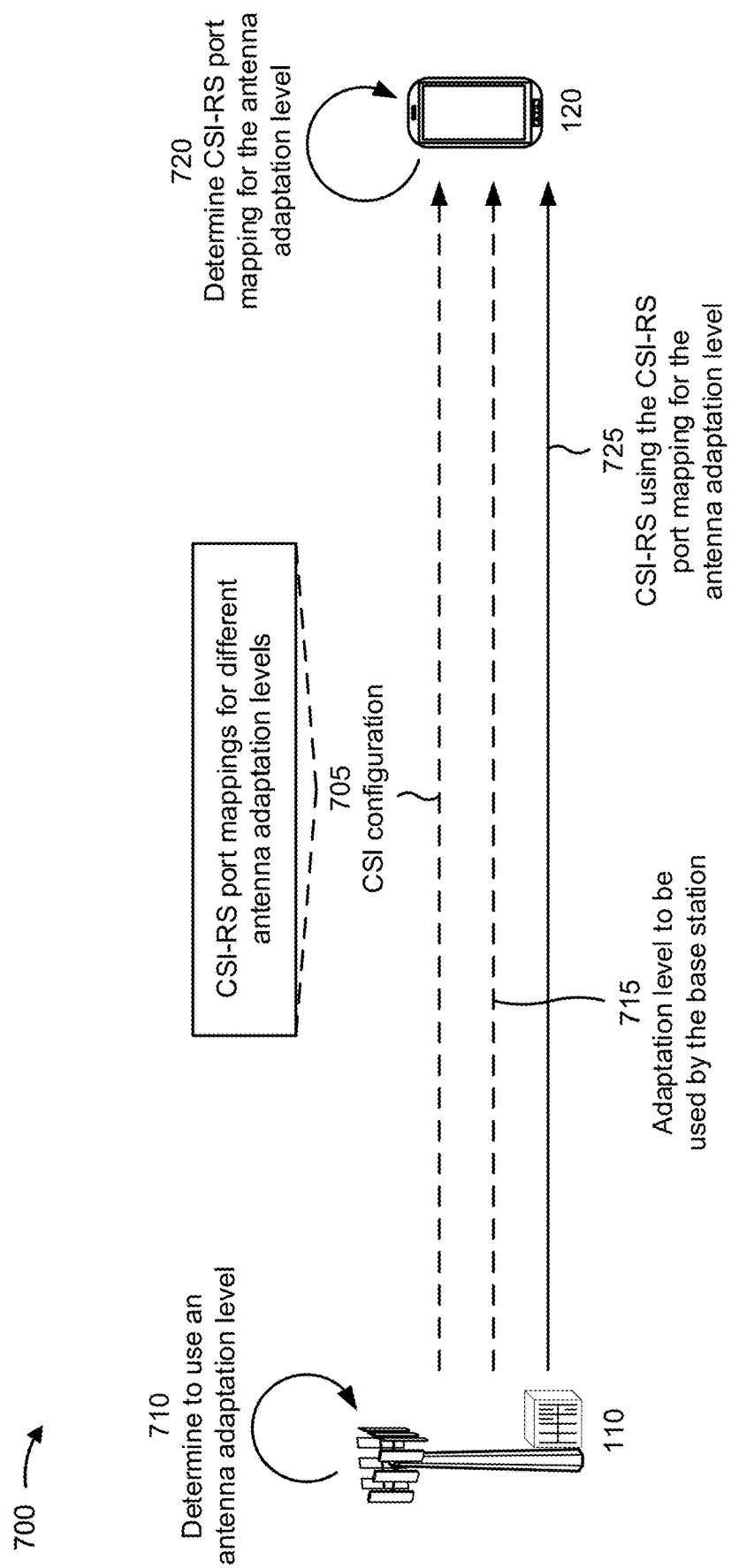
FIG. 7 is a diagram illustrating an example of CSI-RS port mapping for base station antenna adaptation, in accordance with the present disclosure.

FIG. 7 is a diagram illustrating an example 700 of CSI-RS port mapping for base station antenna adaptation, in accordance with the present disclosure. As shown in FIG. 7, a UE 120 may communicate (e.g., transmit an uplink transmission and/or receive a downlink transmission) with a base station 110. The UE 120 and the base station 110 may be part of a wireless network (e.g., the wireless network 100).

As shown by reference number 705, the base station 110 may transmit, and the UE 120 may receive, configuration information. In some aspects, the UE 120 may receive configuration information from another device (e.g., from another base station or another UE). In some aspects, the UE 120 may receive the configuration information via RRC signaling and/or medium access control (MAC) signaling (e.g., MAC control elements (MAC-CEs)).

In some aspects, the configuration information may be a CSI configuration. For example, the configuration information may be a CSI-RS resource mapping configuration (e.g., a CSI-RS-ResourceMapping IE). In some aspects, the configuration information may include an indication of a set of CSI-RS port mappings for different antenna adaptation levels of the base station 110. For example, for CSI-RSs associated with the same quantity of ports at the base station (e.g., Ports X), the same density, and the same CDM type, different CSI-RS port mappings may be defined for the different antenna adaptation levels of the base station 110. In other words, for given values for a set of CSI-RS mapping parameters, different CSI-RS port mappings may be defined for the different antenna adaptation levels of the base station 110. "CSI-RS mapping parameters" may refer to parameters used by the UE 120 to identify a CSI-RS port mapping and/or resource mapping, such as a number of configured CSI-RS ports (e.g., Ports X), a density ($\rho$), a CDM type, one or more time domain and frequency domain locations (($\bar{k}$, $\bar{l}$)), a CDM group index (j), a frequency domain index within a CDM group (k'), and/or a time domain index within a CDM group (l'), among other examples. For example, for one or more row indices in a table defining different CSI-RS resource mappings (e.g., Table 7.3.1.5.3-1 in 3GPP Technical Specification 38.211 Version 16.7.0), one or more CSI-RS port mappings may be defined for different antenna adaptation levels of the base station 110.

In some aspects, the configuration information may indicate all possible configurations (e.g., all CSI-RS mapping parameters) for the different CSI-RS port mappings associated with the different antenna adaptation levels of the base station 110. In other words, the base station 110 may transmit, and the UE 120 may receive, a set of CSI-RS mapping parameters (e.g., a number of configured CSI-RS ports (e.g., Ports X), a density ($\rho$), a CDM type, one or more time domain and frequency domain locations (($\bar{k}$, $\bar{l}$)), a CDM group index (j), a frequency domain index within a CDM group (k'), and/or a time domain index within a CDM group (l'), among other examples) for each CSI-RS port mappings associated with the different antenna adaptation levels of the base station 110.

Alternatively, the CSI-RS port mappings defined for different antenna adaptation levels of the base station 110 may be pre-configured or pre-defined (e.g., by a wireless communication standard, such as the 3GPP). In some aspects, the configuration information may include an indication of one or more CSI-RS port mappings, from the pre-configured or pre-defined CSI-RS port mappings that are supported by the base station 110. For example, a set of CSI-RS port mappings defined for different antenna adaptation levels may be pre-configured or pre-defined and the base station 110 may transmit, to the UE 120, an indication of a subset of CSI-RS port mappings, from the set of CSI-RS port mappings, that are supported by the base station 110. Alternatively, the UE 120 may assume that all of the pre-configured or pre-defined CSI-RS port mappings are supported by the base station 110.

In other words, the UE 120 may receive (e.g., as shown by reference number 705) the set of CSI-RS port mappings for different antenna adaptation levels of the base station 110 from the base station 110 (e.g., in a configuration message, an RRC message, and/or a MAC-CE message, among other examples) or may receive the set of CSI-RS port mappings for different antenna adaptation levels of the base station 110 from pre-configured or pre-defined information stored by the UE 120. In some aspects, the base station 110 may not signal the set of CSI-RS port mappings for different antenna adaptation levels of the base station 110 (e.g., such as when the set of CSI-RS port mappings for different antenna adaptation levels of the base station 110 are pre-configured or pre-defined). In some aspects, the UE 120 may receive the set of CSI-RS port mappings for different antenna adaptation levels of the base station 110 based at least in part on a combination of information signaled by the base station 110 and pre-configured or pre-defined information stored by the UE 120.

Additionally, the base station 110 may transmit, and the UE 120 may receive, an indication that antenna adaptation is to be used by the base station 110 (e.g., in the configuration information or in another message, such as a dynamic message, a MAC-CE message, or a DCI message), in a similar manner as described below in connection with reference number 715. Based at least in part on the configured values for the set of CSI-RS mapping parameters, the pre-configured or pre-defined CSI-RS port mappings for different antenna adaptation levels of the base station 110, and/or the indication that antenna adaptation is to be used by the base station 110, the UE 120 may identify a CSI-RS port mapping for the antenna adaptation level applied by the base station 110.

In some aspects, the CSI-RS port mappings defined for different antenna adaptation levels of the base station 110 may be indicated by the base station 110 (e.g., via the configuration information and/or another message). For example, the CSI-RS port mappings defined for different antenna adaptation levels of the base station 110 may be configured in an RRC configuration (e.g., in the configuration information). Additionally, or alternatively, the CSI-RS port mappings defined for different antenna adaptation levels of the base station 110 may be indicated (e.g., partially, or entirely) via a different message, such as a MAC-CE message or a DCI message. For example, one or more parameters for the CSI-RS port mappings defined for different antenna adaptation levels of the base station 110 may be configured in an RRC configuration, and remaining parameters for the CSI-RS port mappings may be indicated via the different message.

For example, the set of CSI-RS port mappings may include a first CSI-RS port mapping associated with a set of CSI-RS mapping parameters (e.g., a quantity of ports at the base station, a density, and a CDM type) and a first antenna adaptation level. The set of CSI-RS port mappings may include a second CSI-RS port mapping associated with the set of CSI-RS mapping parameters (e.g., with the quantity of ports at the base station, the density, and the CDM type) and a second antenna adaptation level. The first CSI-RS port mapping and the second CSI-RS port mapping may be different.

In some aspects, CSI-RS port mappings associated with given values for the set of CSI-RS mapping parameters may be associated with one or more types or schemes of antenna adaptation CSI-RS port mappings. For example, a first type of antenna adaptation CSI-RS port mappings may be associated with dropping (e.g., not transmitting) one or more CSI-RS resources for a first CSI-RS port mapping, associated with the first antenna adaptation level, relative to a second CSI-RS port mapping, associated with a second antenna adaptation level, where the first CSI-RS port mapping and the second CSI-RS port mapping are associated with the same values for the set of CSI-RS mapping parameters (e.g., are associated with a same row in a table defining CSI-RS resource mappings). A second type of antenna adaptation CSI-RS port mappings may be associated with repeating signals, for the first CSI-RS port mapping, that are transmitted via one or more CSI-RS ports in time-frequency resources associated with other CSI-RS ports in the second CSI-RS port mapping. In other words, a first set of time-frequency resources and a first set of CSI-RS ports may be used by the base station 110 to transmit a CSI-RS in a first set of REs. The base station 110 may repeat the CSI-RSs, using the first set of CSI-RS ports, in a second set of time-frequency resources, where the second set of time-frequency resources are associated with CSI-RS ports (e.g., in the second CSI-RS port mapping) that are used for the second antenna adaptation level, but are not used by the base station 110 for the first antenna adaptation level.

For example, for the first type of antenna adaptation CSI-RS port mappings (e.g., associated with dropping some time-frequency resources), the configuration information may indicate that, for certain antenna adaptation levels, certain time-frequency resources of a CSI-RS port mapping are to be dropped (e.g., not transmitted by the base station 110). For example, the dropped time-frequency resources may be associated with CSI-RS ports that are configured for use by the base station (e.g., in an nrofPorts parameter), but that are not used by the base station 110 at a given antenna adaptation level. For example, the second antenna adaption level described above may be associated with the base station 110 using all (e.g., 100%) of the CSI-RS ports that are configured for use by the base station 110 (e.g., in the nrofPorts parameter). The first antenna adaptation level described above may be associated with the base station 110 using less than all (e.g., less than 100%) of the CSI-RS ports that are configured for use by the base station 110. Therefore, the first CSI-RS port mapping may indicate that the time-frequency resources that are associated with CSI-RS ports that are not used for the first antenna adaptation level are to be dropped. For example, the first antenna adaptation level may indicate that 50% of the CSI-RS ports that are configured for use by the base station 110 are not to be used by the base station 110. The first CSI-RS port mapping may indicate that 50% of the time-frequency resources (e.g., that are defined by the second CSI-RS port mapping) are to be dropped in the first CSI-RS port mapping.

The quantity of time-frequency resources that are to be dropped may be based at least in part on the antenna adaptation level used by the base station 110. For example, if the antenna adaptation level indicates that all (e.g., 100%) of the CSI-RS ports that are configured for use by the base station 110 are to be used by the base station 110, then no time-frequency resources may be dropped. If the antenna adaptation level indicates that half (e.g., 50%) of the CSI-RS ports that are configured for use by the base station 110 are to be used by the base station 110, then half (e.g., 50%) of the time-frequency resources (e.g., that are defined for the given set of CSI-RS mapping parameters) may be dropped. As another example, if the antenna adaptation level indicates that a quarter (e.g., 25%) of the CSI-RS ports that are configured for use by the base station 110 are to be used by the base station 110, then three-quarters (e.g., 75%) of the time-frequency resources (e.g., that are defined for the given set of CSI-RS mapping parameters) may be dropped. As described above, the dropped time-frequency resources may correspond to CSI-RS ports that are not used by the base station 110 (e.g., but that are configured for use) at a given antenna adaptation level. In other words, the one or more CSI-RS resources (e.g., REs or time-frequency resources) that are to be dropped may be associated with one or more antenna ports that are not used by the base station 110 when using the first antenna adaptation level.

In some aspects, the one or more CSI-RS resources (e.g., REs or time-frequency resources) that are to be dropped may be associated with one or more CDM groups indicated by the second CSI-RS port mapping (e.g., indicated by the CSI-RS mapping when all (e.g., 100%) of the configured CSI-RS ports are used by the base station 110). For example, if the antenna adaptation level indicates that half (e.g., 50%) of the CSI-RS ports that are configured for use by the base station 110 are to be used by the base station 110, then time-frequency resources associated with half (e.g., 50%) of the CDM groups (e.g., indicated by the CSI-RS mapping when all (e.g., 100%) of the configured CSI-RS ports are used by the base station 110) may be dropped. For example, the first CSI-RS port mapping (e.g., that is associated with an antenna adaptation level that indicates that less than all of the configured CSI-RS ports are to be used by the base station 110) may indicate that time frequency resources associated with N CDM groups are to be dropped. The N CDM groups may be a first N CDM groups or a last N CDM groups (e.g., in an order defined by indices associated with the CDM groups).

For the second type of antenna adaptation CSI-RS port mappings (e.g., associated with repeating signals transmitted via CSI-RS ports in some time-frequency resources), the configuration information may indicate that the first CSI-RS port mapping, associated with the first antenna adaptation level, is associated with signals (e.g., CSI-RS sequences) transmitted, by the base station 110, via one or more antenna ports being repeated using time-frequency resources associated with other antenna ports as indicated by the second CSI-RS port mapping associated with the second antenna adaptation level. For example, the second type of antenna adaptation CSI-RS port mappings may be associated with repeating CSI-RS ports across time-frequency resources that would have otherwise been associated with other CSI-RS ports if all of the configured CSI-RS ports were used by the base station 110 (e.g., the other CSI-RS ports may be CSI-RS ports that are not used by the base station 110 at a given antenna adaptation level).

In some aspects, the one or more antenna ports (e.g., CSI-RS ports) are associated with a first one or more CDM groups and the other antenna ports (CSI-RS ports) are associated with a second one or more CDM groups. In other words, the base station 110 may transmit an initial transmission using a set of CSI-RS ports over time-frequency resources associated with the first one or more CDM groups and may transmit a repetition of the initial transmission using the set of CSI-RS ports over time-frequency resources associated with the second one or more CDM groups. The second one or more CDM groups may be associated with CSI-RS ports that are configured for use by the base station 110, but that are not used by the base station 110 at a given antenna adaptation level. As used herein, an initial transmission and a repetition may be the same signal. For example, the base station 110 may sound (e.g., transmit) a signal using the first set of CSI-RS ports in a first set of time-frequency locations (e.g., in a first set of REs). The base station 110 may sound (e.g., transmit) the signal using the first set of CSI-RS ports in a second set of time-frequency locations (e.g., in a first set of REs). The second set of time-frequency locations may be associated with CSI-RS ports that would have been used to transmit a CSI-RS if all of the configured CSI-RS ports were used by the base station 110. As described elsewhere herein, this may enable UEs that do not receive, or are unable to decode, an indication that antenna adaptation is applied by the base station 110 to receive and/or measure a signal in the second set of time-frequency locations (e.g., because these UEs may assume that all of the configured CSI-RS ports are used by the base station 110 and may therefore attempt to measure a CSI-RS in the second set of time-frequency locations).

In some aspects, for the second type of antenna adaptation CSI-RS port mappings, a CSI-RS port mapping may indicate a repetition factor associated with a quantity of repetitions of the signals transmitted, by the base station 110, via one or more antenna ports (e.g., the one or more CSI-RS ports). "Repetition factor" may refer to a quantity of subsequent repetitions (e.g., not including an initial transmission) that are to be transmitted. For example, if signals transmitted via the one or more antenna ports (e.g., the one or more CSI-RS ports) are to be repeated 3 times, then the repetition factor may be 3. As another example, if signals transmitted via the one or more antenna ports (e.g., the one or more CSI-RS ports) are to be repeated 2 times, then the repetition factor may be 2. In some aspects, the repetition factor may be based at least in part on the antenna adaptation level used by the base station 110. For example, if the antenna adaptation level indicates that all (e.g., 100%) of the configured CSI-RS ports are to be used by the base station 110, then the CSI-RS port mapping may indicate that no repetitions are to be transmitted (e.g., no repetition factor or a repetition factor of 0). If the antenna adaptation level indicates that half (e.g., 50%) of the configured CSI-RS ports are to be used by the base station 110, then the CSI-RS port mapping may indicate a repetition factor of 2. As another example, if the antenna adaptation level indicates that a quarter (e.g., 25%) of the configured CSI-RS ports are to be used by the base station 110, then the CSI-RS port mapping may indicate a repetition factor of 3.

In some aspects, for the second type of antenna adaptation CSI-RS port mappings, the configuration information may indicate, for a CSI-RS port mapping, that the repetitions are inter-CDM repetitions. "Inter-CDM repetitions" may refer to repeating a signal via a CSI-RS port associated with a first CDM group using time-frequency resources associated with a second CDM group. Additionally, or alternatively, the configuration information may indicate that the repetitions are intra-CDM repetitions. "Intra-CDM repetitions" may refer to repeating a signal via a CSI-RS port associated with a CDM group using time-frequency resources associated with another CSI-RS port that is associated with the same CDM group.

In some aspects, for the second type of antenna adaptation CSI-RS port mappings, the configuration information may indicate, for a CSI-RS port mapping, a first mapping of time-frequency resources to initial transmissions of the signals via the one or more antenna ports (e.g., the one or more CSI-RS ports used by the base station 110) and a second mapping of time-frequency resources to repeated transmissions of the signals via the one or more antenna ports. In other words, the UE 120 may be configured with which CSI-RS ports (e.g., and which time-frequency locations) are to be associated with initial transmissions and which time-frequency locations (e.g., that are associated with other CSI-RS ports not used by the base station 110) are to be associated with repetitions transmitted via the CSI-RS ports. In other words, the UE 120 may be configured with a mapping of a first set of CSI-RS ports (e.g., and time-frequency locations) that are associated with initial transmissions, and time-frequency locations (e.g., that are associated with other CSI-RS ports not used by the base station 110) are to be associated with repetitions transmitted via the first set of CSI-RS ports. For example, the mapping may indicate an association of a CSI-RS port, included in the first set of CSI-RS ports, to a time-frequency location (e.g., an RE) that would have otherwise been associated with a different CSI-RS port if all of the configured CSI-RS ports were used by the base station 110 to transmit the CSI-RS. In some aspects, the mapping may map CSI-RS ports, associated with a first CDM group, to time-frequency locations of another CDM group that would have otherwise been associated with different CSI-RS ports if all of the configured CSI-RS ports were used by the base station 110 to transmit the CSI-RS. In other words, the mapping of antenna ports (e.g., CSI-RS ports) to time-frequency resource locations or to one or more CDM groups for a CSI-RS port mapping, associated with the first antenna adaptation level, may indicate that a single antenna port (e.g., a single CSI-RS port) is mapped to multiple time-frequency resource locations or to multiple CDM groups.

In some aspects, the mapping may be a sequential mapping. For example, a first CSI-RS port associated with a first RE of an initial transmission may be mapped to a first RE associated with a repetition of the initial transmission, a second CSI-RS port associated with a second RE of the initial transmission may be mapped to a second RE associated with the repetition of the initial transmission, a third CSI-RS port associated with a third RE of the initial transmission may be mapped to a third RE associated with the repetition of the initial transmission, and so on. In some aspects, the mapping may be dynamically determined by the base station 110 (e.g., in an ad hoc manner). In some aspects, the mapping may be RRC configured (e.g., the mapping may be indicated via the configuration information). For example, the base station 110 may transmit, and the UE 120 may receive, an indication of the mapping of antenna ports (e.g., CSI-RS ports) to time-frequency resource locations or to one or more CDM groups for a CSI-RS port mapping. Additionally, or alternatively, the mapping may be predefined or pre-configured (e.g., by a wireless communication standard, such as the 3GPP).

For example, a CSI-RS port mapping may be associated with a configured quantity of 32 CSI-RS ports. If all of the 32 configured CSI-RS ports were to be used by the base station 110, then the CSI-RS port mapping may be associated with 4 CDM groups. The CSI-RS port mapping may be associated with a first antenna adaptation level that indicates that 16 CSI-RS ports are to be used by the base station 110 (e.g., from the 32 configured CSI-RS ports) and that 2 CDM groups are to be used. The 16 CSI-RS ports may be mapped to time-frequency resources associated with a first CDM group and to time-frequency resources associated with a second CDM group (e.g., for an initial transmission). The UE 120 may identify time-frequency resources that would have been associated with a third CDM group and a fourth CDM group (e.g., if all of the 32 configured CSI-RS ports were to be used by the base station 110). The 16 CSI-RS ports may be mapped to time-frequency resources associated with the third CDM group and to time-frequency resources associated with the fourth CDM group (e.g., for repetitions). The mapping may indicate that a first 8 CSI-RS ports are mapped to time-frequency resources associated with the first CDM group (e.g., for an initial transmission) and to time-frequency resources associated with the second CDM group (e.g., for repetition). The mapping may indicate that a second 8 CSI-RS ports are mapped to time-frequency resources associated with the third CDM group (e.g., for an initial transmission) and to time-frequency resources associated with the fourth CDM group (e.g., for repetition). As another example, the mapping may indicate that a first 8 CSI-RS ports are mapped to time-frequency resources associated with the first CDM group (e.g., for an initial transmission) and to time-frequency resources associated with the third CDM group (e.g., for repetition). The mapping may indicate that a second 8 CSI-RS ports are mapped to time-frequency resources associated with the second CDM group (e.g., for an initial transmission) and to time-frequency resources associated with the fourth CDM group (e.g., for repetition).

In some aspects, for the second type of antenna adaptation CSI-RS port mappings, the configuration information may indicate, for a CSI-RS port mapping, a quasi co-location (QCL) relationship between a first one or more antenna ports (e.g., a first one or more CSI-RS ports) and a second one or more antenna ports (e.g., a second one or more CSI-RS ports) associated with the CSI-RS port mapping. For example, the CSI-RS port mapping (e.g., if all of the configured CSI-RS ports were to be used by the base station 110) may map time-frequency resources to all of the configured CSI-RS ports. However, when antenna adaptation is used by the base station 110, less than all of the configured CSI-RS ports may be used. When the base station 110 repeats signals via a first CSI-RS port in time-frequency resources that would have otherwise been associated with a second CSI-RS port (e.g., if all of the configured CSI-RS ports were to be used by the base station 110), the base station 110 may indicate a QCL relationship between the first CSI-RS port and the second CSI-RS port. For example, the QCL relationship may indicate that signals transmitted via the first CSI-RS port and the second CSI-RS port share similar transmission direction (or beam) information. The QCL relationship may be a QCL type D relationship (e.g., as defined, or otherwise fixed, by a wireless communication standard, such as the 3GPP) or another type of QCL relationship.

In some aspects, the configuration information may indicate a port numbering for each of the CSI-RS ports associated with a CSI-RS port mapping. For example, the base station 110 may transmit, and the UE 120 may receive, an indication of a port numbering for each of the one or more configured CSI-RS port mappings or for each type of antenna adaptation CSI-RS port mapping.

In some aspects, configured values for a set of CSI-RS mapping parameters may be associated with one or more types of antenna adaptation CSI-RS port mappings. For example, for the table that defines different CSI-RS resource locations and/or port mappings (e.g., Table 7.3.1.5.3-1 in 3GPP Technical Specification 38.211 Version 16.7.0), a single row may be associated with one or more types of antenna adaptation CSI-RS port mappings. For example, a first row may be configured to be associated with only the first type of antenna adaptation CSI-RS port mappings (e.g., associated with dropping some time-frequency resources). A second row may be configured to be associated with only the second type of antenna adaptation CSI-RS port mappings (e.g., associated with repetitions of CSI-RS ports). A third row may be configured to be associated with both the first type of antenna adaptation CSI-RS port mappings and the second type of antenna adaptation CSI-RS port mappings. In other words, a first CSI-RS port mapping, of the one or more CSI-RS port mappings, may associated with a first type of antenna adaptation CSI-RS port mappings. A second CSI-RS port mapping, of the one or more CSI-RS port mappings, may associated with a second type of antenna adaptation CSI-RS port mappings.

This may enable the base station 110 to dynamically indicate which type of antenna adaptation CSI-RS port mappings is to be used (e.g., in a MAC-CE message or a DCI message). For example, if the base station 110 is only serving UEs that are capable of receiving or decoding an indication that antenna adaptation is used by the base station 110 (or the quantity of these UEs is above a threshold), then the base station 110 may determine to use the first type of antenna adaptation CSI-RS port mappings (e.g., because no UEs, or a small number of UEs, may attempt to measure time-frequency resources for CSI-RSs that are not used by the base station 110). As another example, if the base station 110 is serving UEs that are not capable of receiving or decoding an indication that antenna adaptation is used by the base station 110 (or the quantity of these UEs is equal to or above a threshold), then the base station 110 may determine to use the second type of antenna adaptation CSI-RS port mappings (e.g., to improve CSI measurements performed by the UEs that are unaware that antenna adaptation is being applied by the base station 110).

In some aspects, at least one CSI-RS port mapping, of the set of CSI-RS port mappings, is not associated with an antenna adaptation CSI-RS port mapping. The at least one CSI-RS port mapping may be associated with a single antenna port (e.g., a single CSI-RS port). For example, rows in the table that defines different CSI-RS resource locations and/or port mappings that are associated with a single CSI-RS port (e.g., a Ports X value of 1) may not be associated with an antenna adaptation CSI-RS port mapping (e.g., because the base station 110 is not able to reduce the quantity of configured CSI-RS ports used in these scenarios).

In some aspects, the UE 120 may transmit, and the base station 110 may receive, an indication of a capability of the UE 120 to communicate (e.g., one or more of uplink transmissions or downlink transmissions) using CSI-RS port mapping for the different antenna adaptation levels of the base station 110. For example, the UE 120 may indicate a capability of the UE 120 to communicate using the different CSI-RS port mappings for the different antenna adaptation levels (e.g., the UE 120 may indicate a capability of the UE 120 to interpret the CSI-RS port mappings for the different antenna adaptation levels). In some aspects, the UE 120 may transmit the indication via RRC signaling, one or more MAC-CEs, and/or a PUCCH message, among other examples.

As shown by reference number 710, the base station 110 may determine to use an antenna adaptation level. For example, the base station 110 may determine the antenna adaptation level based at least in part on network conditions or a network load. For example, the base station 110 may determine the antenna adaptation level based at least in part on a quantity of UEs being served by the base station 110 (e.g., a quantity of UEs connected to the base station 110), an amount of uplink traffic being communicated by the base station 110, and/or an amount of downlink traffic being communicated by the base station 110, among other examples. Additionally, or alternatively, the base station 110 may determine the antenna adaptation level based at least in part on a capability of UEs being served by the base station 110. For example, if no UEs connected to the base station 110 are capable of decoding or understanding messages associated with antenna adaptation at the base station, then the base station 110 may determine to use an antenna adaptation level in which all (e.g., 100%) of the configured CSI-RS ports are used by the base station 110.

In some aspects, as shown by reference number 715, the base station 110 may transmit, and the UE 120 may receive, an indication of the antenna adaptation level to be used by the base station 110 (e.g., when applying antenna adaptation). For example, the base station 110 may transmit, and the UE 120 may receive, an indication that the base station 110 is to apply antenna adaptation. The base station 110 may transmit, and the UE 120 may receive, an indication of the antenna adaptation level to be used by the base station 110. The indication of the antenna adaptation level may indicate an identifier or an index value that corresponds to the antenna adaptation level to be used by the base station 110. For example, different antenna adaptation levels (e.g., that are supported by the base station 110) may be configured by the base station 110 (e.g., via the configuration information or another message) and/or may be pre-configured or defined (e.g., by a wireless communication standard, such as the 3GPP). Each of the different antenna adaptation levels may be associated with an identifier or an index value that may be used by the base station 110 to indicate the antenna adaptation level to be used by the base station 110. In some aspects, the indication of the antenna adaptation level may indicate a percentage or ratio of antennas or CSI-RS ports to be used by the base station 110 (e.g., may indicate that the base station 110 is to use 50% of the antennas of the base station 110 or of the configured CSI-RS ports). In some aspects, the indication of the antenna adaptation level may indicate a quantity of antennas or CSI-RS ports to be used by the base station 110. In some aspects, the base station 110 may only transmit the indication of the antenna adaptation level if the antenna adaptation level is associated with the base station 110 using less than all of the configured CSI-RS ports. In other words, if the base station 110 is to use all of the configured CSI-RS ports, then the base station 110 may not transmit the indication that the base station 110 is to apply antenna adaptation and/or the indication of the antenna adaptation level. The UE 120 may assume that all of the configured CSI-RS ports are to be used by the base station 110 unless the UE 120 receives an indication of the antenna adaptation level. The base station 110 may transmit, and the UE 120 may receive, the indication of the antenna adaptation level via an RRC configuration message or a dynamic message (e.g., a MAC-CE message or a DCI message).

In some aspects, the indication of the antenna adaptation level may be associated with a validity period (e.g., an amount of time that the antenna adaptation level is to be used by the base station 110). After an expiration of the validity period, the UE 120 may assume that all of the configured CSI-RS ports are to be used by the base station 110. Alternatively, the UE 120 may assume that the antenna adaptation level is to be used by the base station 110 until the UE 120 receives an indication of a different antenna adaptation level to be used by the base station 110.

As shown by reference number 720, the UE 120 may determine the CSI-RS port mapping and/or resource location for a CSI-RS based at least in part on the antenna adaptation level. Additionally, the UE 120 may determine the CSI-RS port mapping and/or resource location for a CSI-RS based at least in part on one or more CSI-RS mapping parameters (e.g., a number of configured CSI-RS ports (e.g., Ports X), a density ($\rho$), a CDM type, one or more time domain and frequency domain locations (($\bar{k}$, $\bar{l}$)), a CDM group index (j), a frequency domain index within a CDM group (k'), and/or a time domain index within a CDM group (l'), among other examples) associated with the CSI-RS. For example, different sets of CSI-RS port mapping and/or resource locations may be configured or defined (e.g., a set of rows in a table, such as the table depicted in FIG. 5A and/or the Table 7.3.1.5.3-1 in 3GPP Technical Specification 38.211 Version 16.7.0). One or more CSI-RS port mappings and/or resource locations (e.g., one or more rows in the table) may be associated the CSI-RS port mappings and/or resource locations for different antenna adaptation levels of the base station 110. Therefore, the UE 120 may determine the CSI-RS port mapping and/or resource location for a CSI-RS based at least in part on the CSI-RS mapping parameters for the CSI-RS (e.g., based at least in part on a row in the table configured by the base station 110 or pre-configured on the UE 120) and based at least in part on the antenna adaptation level indicated by the base station 110.

In some aspects, the UE 120 may determine the CSI-RS port mapping and/or resource location for the CSI-RS based at least in part on a type of antenna adaptation CSI-RS port mapping used by the base station 110 (e.g., which may be indicated by the base station 110 to the UE 120 or may be pre-defined or pre-configured). For example, the UE 120 may determine whether the antenna adaptation level indicates that less than all of the configured CSI-RS ports are used by the base station 110 to transmit CSI-RSs. If the antenna adaptation level indicates that all of the configured CSI-RS ports are used by the base station 110, then the UE 120 may determine the CSI-RS port mapping and/or resource location for a CSI-RS where the CSI-RS port mapping is not associated with the dropping of time-frequency resources or repetitions (e.g., as described in more detail elsewhere herein). If the antenna adaptation level indicates that less than all of the configured CSI-RS ports are used by the base station 110, then the UE 120 may determine the CSI-RS port mapping and/or resource location for a CSI-RS where the CSI-RS port mapping is associated with the dropping of time-frequency resources or repetitions (e.g., as described in more detail elsewhere herein).

As shown by reference number 725, the base station 110 may transmit, and the UE 120 may receive, a CSI-RS in accordance with a CSI-RS port mapping, from the set of CSI-RS port mappings, for the antenna adaptation level used by the base station 110. For example, if the antenna adaptation level indicates that less than all of the configured CSI-RS ports are used to transmit the CSI-RS, then the CSI-RS port mapping may indicate that one or more time-frequency resources are dropped (e.g., relative to a CSI-RS port mapping associated with all of the configured CSI-RS ports being used with the same CSI-RS mapping parameters). As another example, if the antenna adaptation level indicates that less than all of the configured CSI-RS ports are used to transmit the CSI-RS, then the CSI-RS port mapping may indicate that some time-frequency resources associated with the CSI-RS include repetitions transmitted via a CSI-RS port. For example, the time-frequency resources associated with repetitions may be time-frequency resources that are associated with CSI-RS ports that are not used by the base station 110, but would have been used if all of the configured CSI-RS ports were used by the base station 110 to transmit the CSI-RS. The UE 120 may measure the CSI-RS received from the base station 110. In some aspects, the UE 120 may transmit, and the base station 110 may receive, a CSI report indicating one or more measurements of the CSI-RS.

In some aspects, when the first type of antenna adaptation CSI-RS port mappings (e.g., associated with dropping some time-frequency resources) is used for the CSI-RS transmission, a power boost may be applied by the base station 110 to the CSI-RS transmission. For example, the base station 110 may transmit the CSI-RS with a higher transmit power compared to a transmit power that would have been used if all of the configured CSI-RS ports were used by the base station 110. For example, because the base station 110 is transmitting using fewer time-frequency resources, the base station 110 may be enabled to use a larger transmit power over the time-frequency resources. Applying the power boost may improve a performance and/or increase a reliability of the CSI-RS transmission.

In some aspects, the UE 120 may monitor for the CSI-RS based at least in part on the determined CSI-RS port mapping and/or resource location for a CSI-RS. For example, the UE 120 may monitor time-frequency locations as indicated by the determined CSI-RS port mapping and/or resource location. This may improve reception performance of the UE 120 for the CSI-RS because the UE 120 is enabled to the correct monitor time-frequency locations in which the base station 110 is to transmit the CSI-RS when the base station 110 is applying antenna adaptation (e.g., rather than monitoring time-frequency locations in which the base station 110 would have transmitted the CSI-RS if the base station 110 were using all configured CSI-RS ports or all antennas of the base station 110). Additionally, this may conserve resources (e.g., processing resources and/or power resources) of the UE 120 that would have otherwise been used by the UE 120 monitoring time-frequency locations in which the base station 110 is not transmitting the CSI-RS.

The UE 120 may measure the CSI-RS based at least in part on receiving the CSI-RS. For example, the UE 120 may monitor time-frequency locations, as indicated by the determined CSI-RS port mapping and/or resource location, and may measure signals received by the UE 120 in the time-frequency locations. By monitoring the correct monitor time-frequency locations in which the base station 110 is to transmit the CSI-RS, measurements of the CSI-RS performed by the UE 120 may be improved. For example, if the UE 120 were to measure signals received in time-frequency locations in which the base station 110 would have transmitted the CSI-RS if the base station 110 were using all configured CSI-RS ports or all antennas of the base station 110 (e.g., but that are not used by the base station 110 when applying antenna adaptation), the UE 120 may have measured noise or other signals not related to the CSI-RS and may assume that the measured noise or other signals are the CSI-RS. By monitoring the correct monitor time-frequency locations, the measurement of the CSI-RS may be improved by ensuring that the UE 120 is not measuring noise or other signals that are not related to the CSI-RS. As a result, an accuracy and/or efficiency of CSI measurements performed by the UE 120 may be improved.

In some aspects, the UE 120 may transmit, and the base station 110 may receive, a CSI measurement report. The CSI measurement report may indicate one or more measurements, performed by the UE 120, of the CSI-RS. For example, as described above, the UE 120 may measure the CSI-RS transmitted by the base station 110 (e.g., when the base station 110 is applying antenna adaptation) and may report the measurement(s) to the base station 110 (e.g., in the CSI measurement report). In other words, receiving the CSI-RS may include monitoring the time-frequency locations indicated by the determined CSI-RS port mapping and/or resource location. The UE 120 may measure the CSI-RS in accordance with the CSI-RS port mapping and/or resource location. The UE 120 may transmit, and the base station 110 may receive, a CSI measurement report indicating one or more measurements of the CSI-RS. Enabling the UE to correctly monitor for, measure the CSI-RS, and/or report the measurement(s) of the CSI-RS may improve performance for the UE and/or scheduling determinations by the base station 110 by improving the accuracy of CSI reported by the UE 120. Moreover, this may enable the base station 110 to efficiently use antenna adaptation (e.g., without degrading a performance of UEs within the wireless network), thereby enabling the base station 110 to conserve power.

As indicated above, FIG. 7 is provided as an example. Other examples may differ from what is described with regard to FIG. 7.

Figure 8:
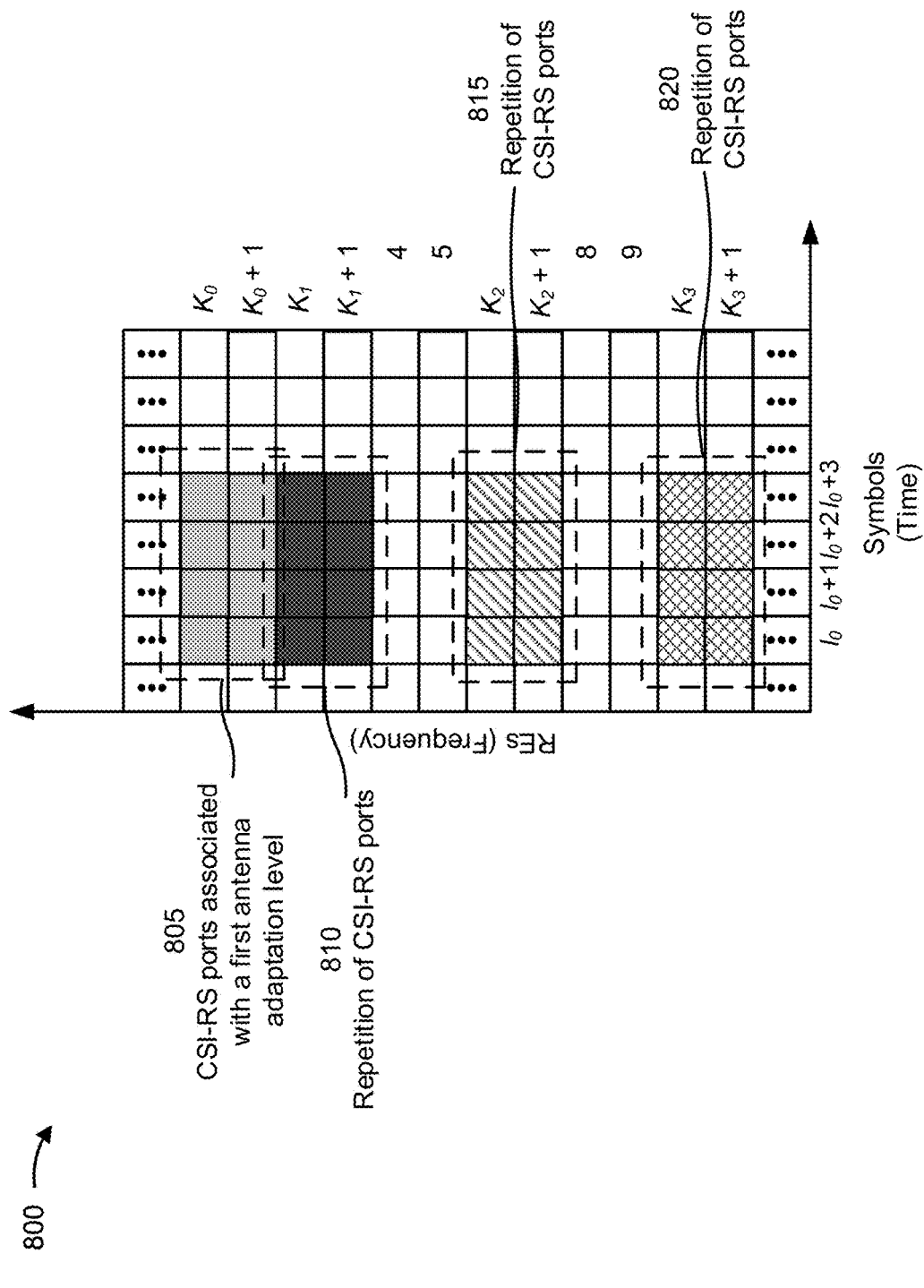
FIG. 8 is a diagram illustrating an example of an antenna adaptation CSI-RS port mapping associated with repetitions, in accordance with the present disclosure.

FIG. 8 is a diagram illustrating an example 800 of an antenna adaptation CSI-RS port mapping associated with repetitions, in accordance with the present disclosure. For example, the example 800 may be an example of the second type of antenna adaptation CSI-RS port mappings described above. The example 800 is associated with CSI-RS mapping parameters similar to the CSI-RS depicted and described above in connection with FIG. 5 (e.g., 32 configured CSI-RS ports and 4 CDM groups). The example 800 may be associated with an antenna adaptation level that indicates that 8 CSI-RS ports (e.g., of the 32 configured CSI-RS ports) are to be used by the base station 110 to transmit a CSI-RS. FIG. 8 is provided as an example and other CSI-RS resource mappings and/or other antenna adaptation levels may be used by the base station 110 in a similar manner as described herein.

As shown by reference number 805, the 8 CSI-RS ports may be mapped to a first CDM group and/or a first set of time-frequency resources (e.g., REs). For example, the 8 CSI-RS ports may be mapped to the first CDM group and/or the first set of time-frequency resources for an initial transmission (e.g., to sound the 8 CSI-RS ports using the first set of time-frequency resources). As shown by reference number 810, the 8 CSI-RS ports may be mapped to a second CDM group and/or a second set of time-frequency resources (e.g., REs). For example, the 8 CSI-RS ports may be mapped to the second CDM group and/or the second set of time-frequency resources for a repetition (e.g., a repetition of the signals transmitted via the 8 CSI-RS ports using the first set of time-frequency resources). In other words, the CSI-RS sequences transmitted via the first set of time-frequency resources may be repeated using the second set of time-frequency resources. In some aspects, the transmissions via the first CDM and the second CDM may use different OCCs.

As shown by reference number 815, the 8 CSI-RS ports may be mapped to a third CDM group and/or a third set of time-frequency resources. For example, the 8 CSI-RS ports may be mapped to the third CDM group and/or the third set of time-frequency resources for a repetition (e.g., a repetition of the signals transmitted via the 8 CSI-RS ports using the first set of time-frequency resources). In other words, the CSI-RS sequences transmitted via the first set of time-frequency resources may be repeated using the third set of time-frequency resources. The first CDM, the second CDM, and the second CDM may use different OCCs.

As shown by reference number 820, the 8 CSI-RS ports may be mapped to a fourth CDM group and/or a fourth set of time-frequency resources. For example, the 8 CSI-RS ports may be mapped to the fourth CDM group and/or the fourth set of time-frequency resources for a repetition (e.g., a repetition of the signals transmitted via the 8 CSI-RS ports using the first set of time-frequency resources). In other words, the CSI-RS sequences transmitted via the first set of time-frequency resources may be repeated using the fourth set of time-frequency resources. The first CDM group, the second CDM group, the third CDM group, and the fourth CDM group may use different OCCs.

As a result, the base station 110 may be enabled to use 8 CSI-RS ports (e.g., rather than the 32 configured CSI-RS ports) to transmit a CSI-RS, thereby conserving power of the base station 110. Additionally, by using repetitions, UEs that are unaware that the base station 110 is applying antenna adaptation may be enabled to receive and/or measure signals in the second set of time-frequency resources, the third set of time-frequency resources, and/or the fourth set of time-frequency resources, thereby improving CSI measurements performed by those UEs.

As indicated above, FIG. 8 is provided as an example. Other examples may differ from what is described with regard to FIG. 8.

Figure 9:
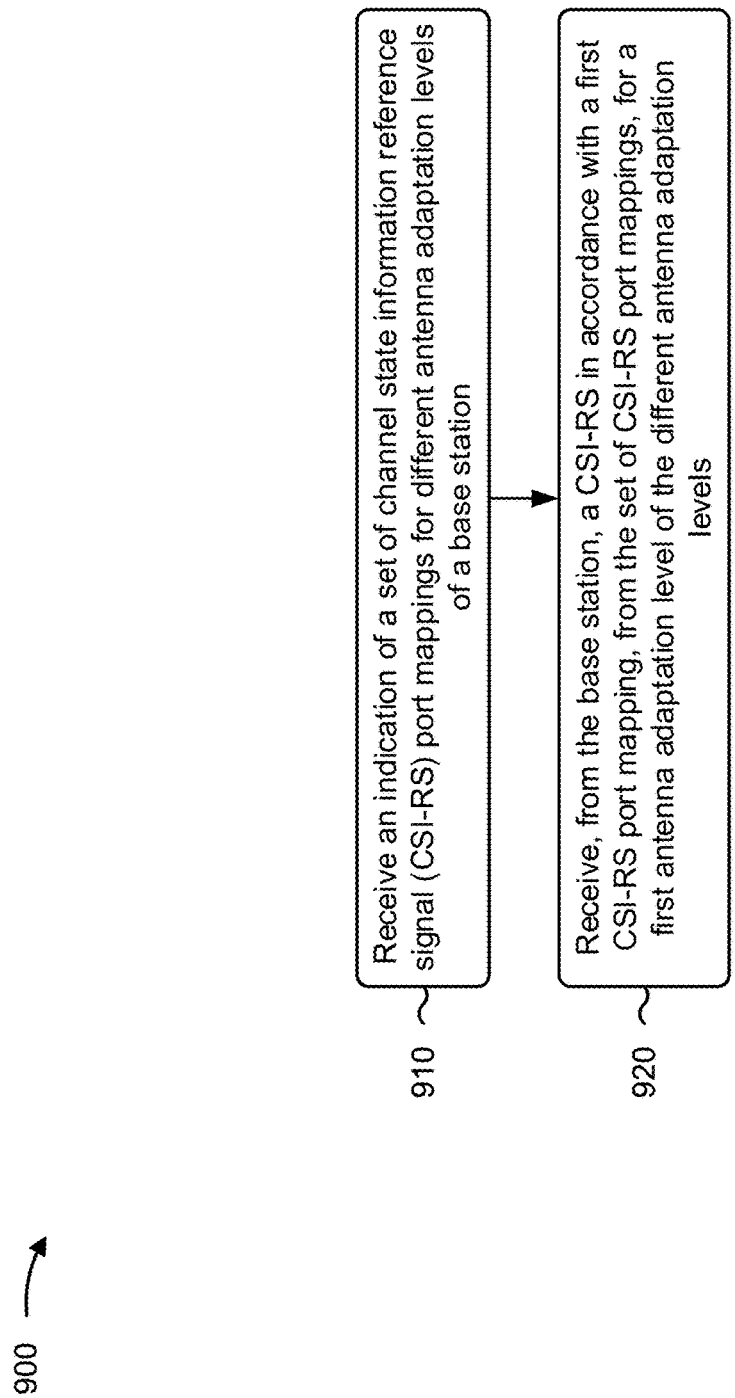
FIGS. 9 and 10 are diagrams illustrating example processes associated with CSI-RS port mapping for base station antenna adaptation, in accordance with the present disclosure.

FIG. 9 is a diagram illustrating an example process 900 performed, for example, by a UE, in accordance with the present disclosure. Example process 900 is an example where the UE (e.g., UE 120) performs operations associated with CSI-RS port mapping for base station antenna adaptation.

As shown in FIG. 9, in some aspects, process 900 may include receiving an indication of a set of CSI-RS port mappings for different antenna adaptation levels of a base station (block 910). For example, the UE (e.g., using communication manager 140 and/or reception component 1102, depicted in FIG. 11) may receive an indication of a set of CSI-RS port mappings for different antenna adaptation levels of a base station, as described above.

As further shown in FIG. 9, in some aspects, process 900 may include receiving, from the base station, a CSI-RS in accordance with a first CSI-RS port mapping, from the set of CSI-RS port mappings, for a first antenna adaptation level of the different antenna adaptation levels (block 920). For example, the UE (e.g., using communication manager 140 and/or reception component 1102, depicted in FIG. 11) may receive, from the base station, a CSI-RS in accordance with a first CSI-RS port mapping, from the set of CSI-RS port mappings, for a first antenna adaptation level of the different antenna adaptation levels, as described above.

Process 900 may include additional aspects, such as any single aspect or any combination of aspects described below and/or in connection with one or more other processes described elsewhere herein.

In a first aspect, the antenna adaptation level indicates a quantity of ports to be used by the base station to transmit the CSI-RS relative to a quantity of ports configured for use at the base station.

In a second aspect, alone or in combination with the first aspect, the set of CSI-RS port mappings includes the first CSI-RS port mapping associated with a quantity of ports at the base station, a density, a CDM type, and the first antenna adaptation level, and a second CSI-RS port mapping associated with the quantity of ports at the base station, the density, the CDM type, and a second antenna adaptation level.

In a third aspect, alone or in combination with one or more of the first and second aspects, the first CSI-RS port mapping, associated with the first antenna adaptation level, indicates one or more CSI-RS resources that are to be dropped relative to a second CSI-RS port mapping, associated with a second antenna adaptation level.

In a fourth aspect, alone or in combination with one or more of the first through third aspects, the one or more CSI-RS resources that are to be dropped are associated with one or more antenna ports that are not used by the base station when using the first antenna adaptation level.

In a fifth aspect, alone or in combination with one or more of the first through fourth aspects, the one or more CSI-RS resources that are to be dropped are associated with one or more CDM groups indicated by the second CSI-RS port mapping.

In a sixth aspect, alone or in combination with one or more of the first through fifth aspects, the first CSI-RS port mapping, associated with the first antenna adaptation level, indicates that signals transmitted, by the base station, via one or more antenna ports are to be repeated using time-frequency resources associated with other antenna ports as indicated by a second CSI-RS port mapping associated with a second antenna adaptation level.

In a seventh aspect, alone or in combination with one or more of the first through sixth aspects, the one or more antenna ports are associated with a first one or more CDM groups and the other antenna ports are associated with a second one or more CDM groups.

In an eighth aspect, alone or in combination with one or more of the first through seventh aspects, the first CSI-RS port mapping indicates a repetition factor associated with a quantity of repetitions of the signals transmitted, by the base station, via the one or more antenna ports.

In a ninth aspect, alone or in combination with one or more of the first through eighth aspects, the repetition factor is based at least in part on the first antenna adaptation level.

In a tenth aspect, alone or in combination with one or more of the first through ninth aspects, the first CSI-RS port mapping indicates a first mapping of time-frequency resources to initial transmissions of the signals via the one or more antenna ports and a second mapping of time-frequency resources to repeated transmissions of the signals via the one or more antenna ports.

In an eleventh aspect, alone or in combination with one or more of the first through tenth aspects, the first CSI-RS port mapping, of the one or more CSI-RS port mappings, is associated with a first type of antenna adaptation CSI-RS port mappings, and a second CSI-RS port mapping, of the one or more CSI-RS port mappings, is associated with a second type of antenna adaptation CSI-RS port mappings.

In a twelfth aspect, alone or in combination with one or more of the first through eleventh aspects, at least one CSI-RS port mapping, of the set of CSI-RS port mappings, is not associated with an antenna adaptation CSI-RS port mapping.

In a thirteenth aspect, alone or in combination with one or more of the first through twelfth aspects, the at least one CSI-RS port mapping is associated with a single antenna port.

In a fourteenth aspect, alone or in combination with one or more of the first through thirteenth aspects, the first CSI-RS port mapping, associated with the first antenna adaptation level, indicates a mapping of antenna ports to time-frequency resource locations or to one or more CDM groups.

In a fifteenth aspect, alone or in combination with one or more of the first through fourteenth aspects, receiving the indication of the set of CSI-RS port mappings includes receiving an indication of the mapping of antenna ports to time-frequency resource locations or to one or more CDM groups for the first CSI-RS port mapping.

In a sixteenth aspect, alone or in combination with one or more of the first through fifteenth aspects, the mapping of antenna ports to the time-frequency resource locations or to the one or more CDM groups for the first CSI-RS port mapping, associated with the first antenna adaptation level, indicates that a single antenna port is mapped to multiple time-frequency resource locations or to multiple CDM groups.

In a seventeenth aspect, alone or in combination with one or more of the first through sixteenth aspects, the first CSI-RS port mapping, associated with the first antenna adaptation level, indicates a QCL relationship between a first one or more antenna ports and a second one or more antenna ports associated with the first CSI-RS port mapping.

In an eighteenth aspect, alone or in combination with one or more of the first through seventeenth aspects, receiving the indication of the set of CSI-RS port mappings includes receiving an indication of a port numbering for each of the one or more CSI-RS port mappings or for each type of antenna adaptation CSI-RS port mapping.

In a nineteenth aspect, alone or in combination with one or more of the first through eighteenth aspects, process 900 includes receiving an indication of the first antenna adaptation level to be used by the base station when applying antenna adaptation.

In a twentieth aspect, alone or in combination with one or more of the first through nineteenth aspects, receiving the CSI-RS includes monitoring time-frequency locations indicated by the first CSI-RS port mapping.

In a twenty-first aspect, alone or in combination with one or more of the first through twentieth aspects, process 900 includes measuring the CSI-RS in accordance with the first CSI-RS port mapping.

In a twenty-second aspect, alone or in combination with one or more of the first through twenty-first aspects, process 900 includes transmitting, to the base station, a CSI measurement report indicating one or more measurements of the CSI-RS.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
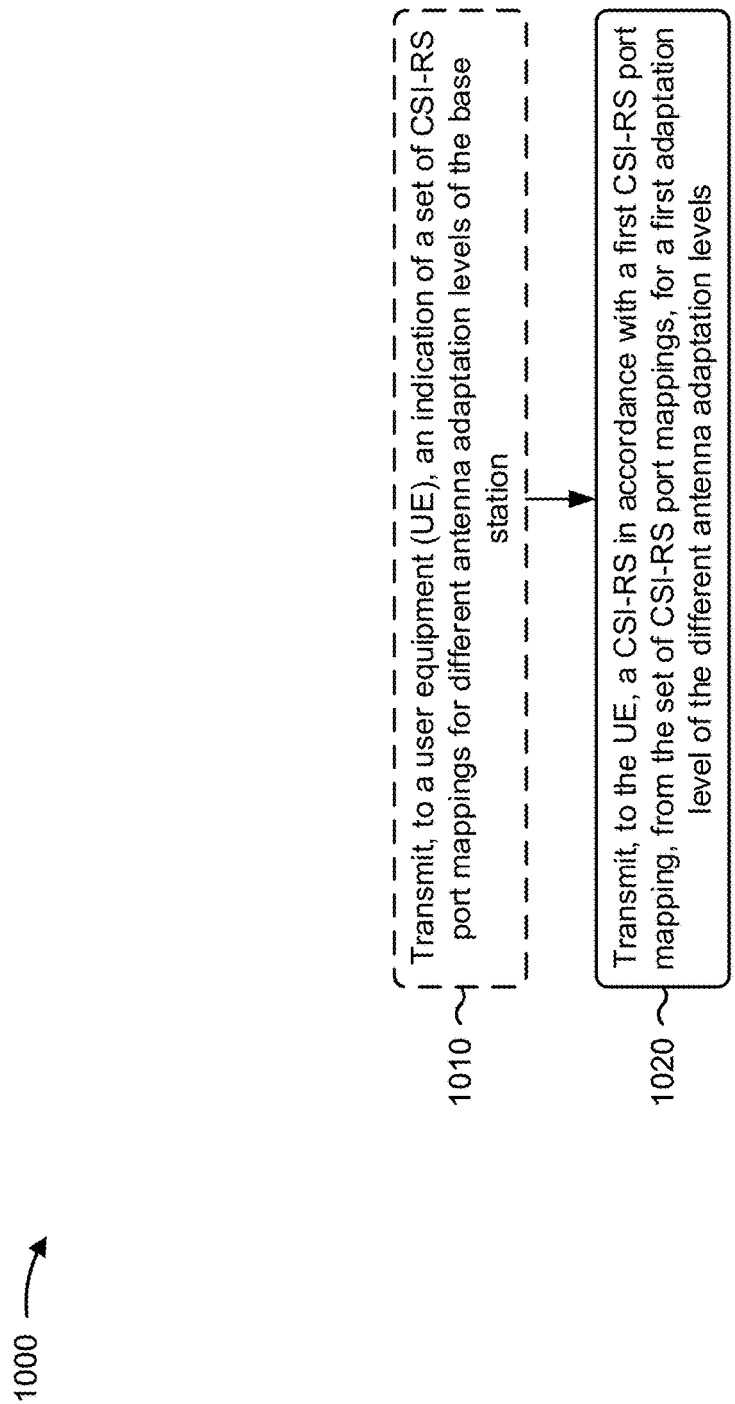

FIG. 10 is a diagram illustrating an example process 1000 performed, for example, by a base station, in accordance with the present disclosure. Example process 1000 is an example where the base station (e.g., base station 110) performs operations associated with CSI-RS port mapping for base station antenna adaptation.

As shown in FIG. 10, in some aspects, process 1000 may optionally include transmitting, to a UE, an indication of a set of CSI-RS port mappings for different antenna adaptation levels of the base station (block 1010). For example, the base station (e.g., using communication manager 150 and/or transmission component 1204, depicted in FIG. 12) may transmit, to a UE, an indication of a set of CSI-RS port mappings for different antenna adaptation levels of the base station, as described above.

As further shown in FIG. 10, in some aspects, process 1000 may include transmitting, to the UE, a CSI-RS in accordance with a first CSI-RS port mapping, from the set of CSI-RS port mappings, for a first adaptation level of the different antenna adaptation levels (block 1020). For example, the base station (e.g., using communication manager 150 and/or transmission component 1204, depicted in FIG. 12) may transmit, to the UE, a CSI-RS in accordance with a first CSI-RS port mapping, from the set of CSI-RS port mappings, for a first adaptation level of the different antenna adaptation levels, as described above.

Process 1000 may include additional aspects, such as any single aspect or any combination of aspects described below and/or in connection with one or more other processes described elsewhere herein.

In a first aspect, the first antenna adaptation level indicates a quantity of ports to be used by the base station to transmit the CSI-RS relative to a quantity of ports configured for use at the base station.

In a second aspect, alone or in combination with the first aspect, the set of CSI-RS port mappings includes the first CSI-RS port mapping associated with a quantity of ports at the base station, a density, a CDM type, and the first antenna adaptation level, and a second CSI-RS port mapping associated with the quantity of ports at the base station, the density, the CDM type, and a second antenna adaptation level.

In a third aspect, alone or in combination with one or more of the first and second aspects, the first CSI-RS port mapping, associated with the first antenna adaptation level, indicates one or more CSI-RS resources that are to be dropped relative to a second CSI-RS port mapping, associated with a second antenna adaptation level.

In a fourth aspect, alone or in combination with one or more of the first through third aspects, the one or more CSI-RS resources that are to be dropped are associated with one or more antenna ports that are not used by the base station when using the first antenna adaptation level.

In a fifth aspect, alone or in combination with one or more of the first through fourth aspects, the one or more CSI-RS resources that are to be dropped are associated with one or more CDM groups indicated by the second CSI-RS port mapping.

In a sixth aspect, alone or in combination with one or more of the first through fifth aspects, the first CSI-RS port mapping, associated with the first antenna adaptation level, indicates that signals transmitted, by the base station, via one or more antenna ports are to be repeated using time-frequency resources associated with other antenna ports as indicated by a second CSI-RS port mapping associated with a second antenna adaptation level.

In a seventh aspect, alone or in combination with one or more of the first through sixth aspects, the one or more antenna ports are associated with a first one or more CDM groups and the other antenna ports are associated with a second one or more CDM groups.

In an eighth aspect, alone or in combination with one or more of the first through seventh aspects, the first CSI-RS port mapping indicates a repetition factor associated with a quantity of repetitions of the signals transmitted, by the base station, via the one or more antenna ports.

In a ninth aspect, alone or in combination with one or more of the first through eighth aspects, the repetition factor is based at least in part on the first antenna adaptation level.

In a tenth aspect, alone or in combination with one or more of the first through ninth aspects, the first CSI-RS port mapping indicates a first mapping of time-frequency resources to initial transmissions of the signals via the one or more antenna ports and a second mapping of time-frequency resources to repeated transmissions of the signals via the one or more antenna ports.

In an eleventh aspect, alone or in combination with one or more of the first through tenth aspects, the first CSI-RS port mapping, of the one or more CSI-RS port mappings, is associated with a first type of antenna adaptation CSI-RS port mappings, and a second CSI-RS port mapping, of the one or more CSI-RS port mappings, is associated with a second type of antenna adaptation CSI-RS port mappings.

In a twelfth aspect, alone or in combination with one or more of the first through eleventh aspects, at least one CSI-RS port mapping, of the set of CSI-RS port mappings, are not associated with an antenna adaptation CSI-RS port mapping.

In a thirteenth aspect, alone or in combination with one or more of the first through twelfth aspects, the at least one CSI-RS port mapping is associated with a single antenna port.

In a fourteenth aspect, alone or in combination with one or more of the first through thirteenth aspects, the first CSI-RS port mapping, associated with the first antenna adaptation level, indicates a mapping of antenna ports to time-frequency resource locations or to one or more CDM groups.

In a fifteenth aspect, alone or in combination with one or more of the first through fourteenth aspects, transmitting the indication of the set of CSI-RS port mappings includes transmitting an indication of the mapping of antenna ports to time-frequency resource locations or to one or more CDM groups for the first CSI-RS port mapping.

In a sixteenth aspect, alone or in combination with one or more of the first through fifteenth aspects, the mapping of antenna ports to time-frequency resource locations or to one or more CDM groups for the first CSI-RS port mapping indicates that a single antenna port is mapped to multiple time-frequency resource locations or to multiple CDM groups.

In a seventeenth aspect, alone or in combination with one or more of the first through sixteenth aspects, the first CSI-RS port mapping, associated with the first antenna adaptation level, indicates a QCL relationship between a first one or more antenna ports and a second one or more antenna ports associated with the first CSI-RS port mapping.

In an eighteenth aspect, alone or in combination with one or more of the first through seventeenth aspects, transmitting the indication of the set of CSI-RS port mappings includes transmitting an indication of a port numbering for each of the one or more CSI-RS port mappings or for each type of antenna adaptation CSI-RS port mapping.

In a nineteenth aspect, alone or in combination with one or more of the first through eighteenth aspects, process 1000 includes transmitting, to the UE, an indication of the first antenna adaptation level to be used by the base station when applying antenna adaptation.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
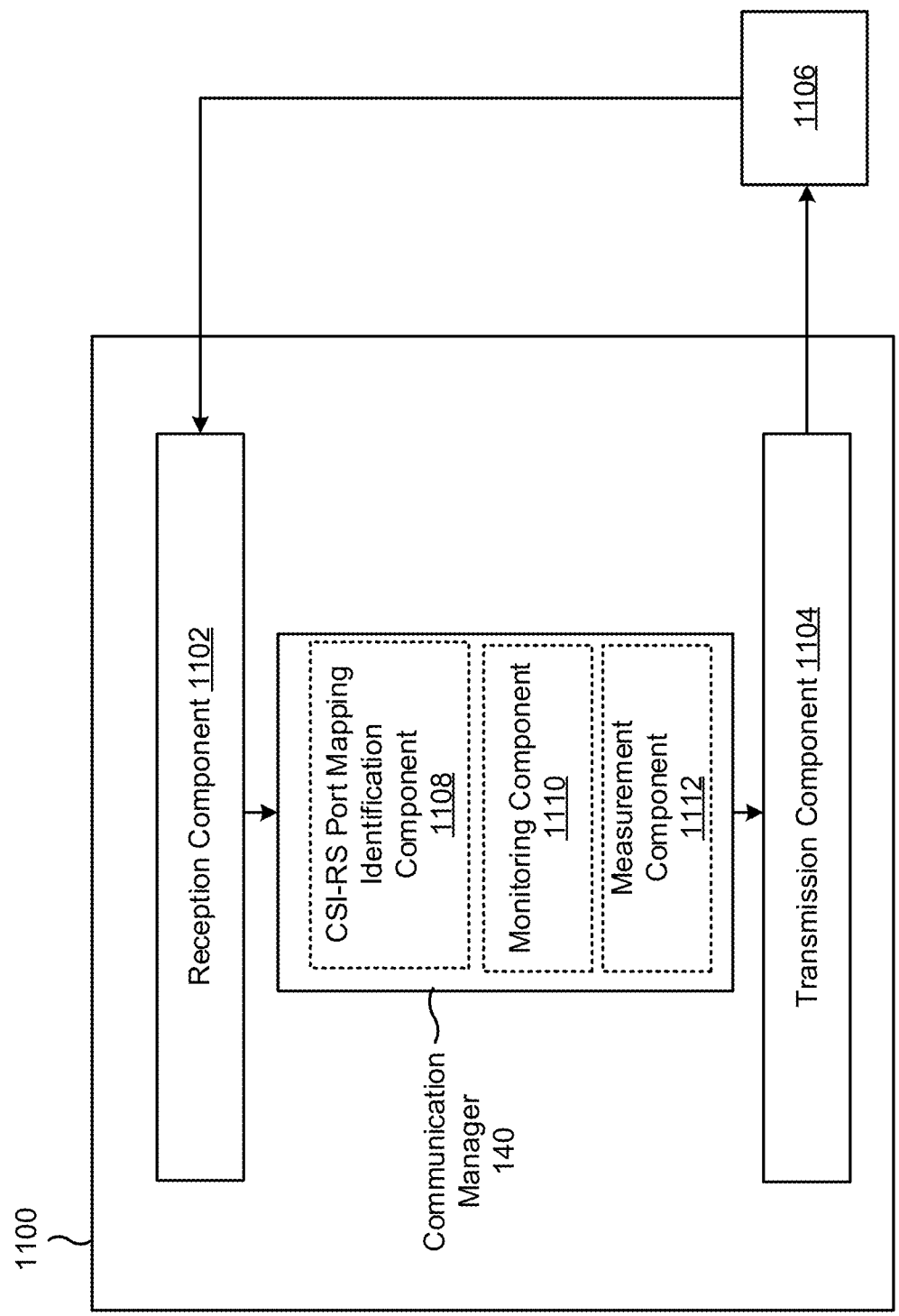
FIGS. 11 and 12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a CSI-RS port mapping identification component 1108, a monitoring component 1110, and/or a measurement component 1112, among other examples.

In some aspects, the apparatus 1100 may be configured to perform one or more operations described herein in connection with FIGS. 7 and 8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive an indication of a set of CSI-RS port mappings for different antenna adaptation levels of a base station. The reception component 1102 may receive, from the base station, a CSI-RS in accordance with a first CSI-RS port mapping, from the set of CSI-RS port mappings, for a first antenna adaptation level of the different antenna adaptation levels.

The CSI-RS port mapping identification component 1108 may identify the first CSI-RS port mapping based at least in part on the first antenna adaptation level. Additionally, or alternatively, the CSI-RS port mapping identification component 1108 may identify the first CSI-RS port mapping based at least in part on one or more RRC parameters associated with the CSI-RS.

The reception component 1102 may receive an indication of the first antenna adaptation level to be used by the base station when applying antenna adaptation.

The monitoring component 1110 may monitor time-frequency locations indicated by the first CSI-RS port mapping.

The measurement component 1112 may measure the CSI-RS in accordance with the first CSI-RS port mapping.

The transmission component 1104 may transmit, to the base station, a CSI measurement report indicating one or more measurements of the CSI-RS.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
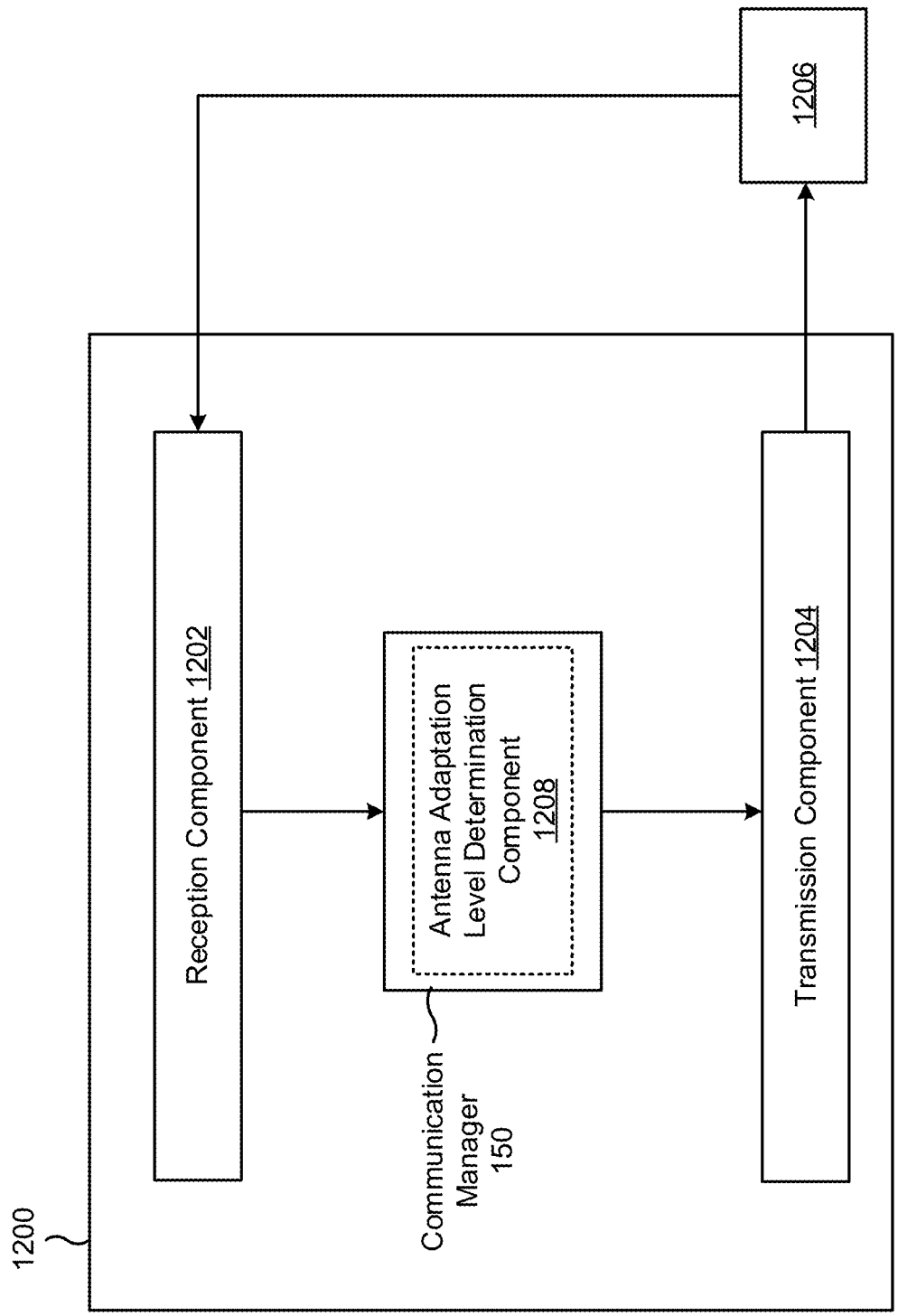

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include an antenna adaptation level determination component 1208, among other examples.

In some aspects, the apparatus 1200 may be configured to perform one or more operations described herein in connection with FIGS. 7 and 8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The transmission component 1204 may transmit, to a UE, an indication of a set of CSI-RS port mappings for different antenna adaptation levels of the base station. The transmission component 1204 may transmit, to the UE, a CSI-RS in accordance with a first CSI-RS port mapping, from the set of CSI-RS port mappings, for a first adaptation level of the different antenna adaptation levels.

The transmission component 1204 may transmit, to the UE, an indication of the first antenna adaptation level to be used by the base station when applying antenna adaptation.

The antenna adaptation level determination component 1208 may determine the first antenna adaptation level. The antenna adaptation level determination component 1208 may determine the first antenna adaptation level based at least in part on at least one of network conditions or a network load.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving an indication of a set of channel state information (CSI) reference signal (CSI-RS) port mappings for different antenna adaptation levels of a base station; and receiving, from the base station, a CSI-RS in accordance with a first CSI-RS port mapping, from the set of CSI-RS port mappings, for a first antenna adaptation level of the different antenna adaptation levels.

Aspect 2: The method of Aspect 1, wherein the antenna adaptation level indicates a quantity of ports to be used by the base station to transmit the CSI-RS relative to a quantity of ports configured for use at the base station.

Aspect 3: The method of any of Aspects 1-2, wherein the set of CSI-RS port mappings includes: the first CSI-RS port mapping associated with a quantity of ports at the base station, a density, a code division multiplex (CDM) type, and the first antenna adaptation level, and a second CSI-RS port mapping associated with the quantity of ports at the base station, the density, the CDM type, and a second antenna adaptation level.

Aspect 4: The method of any of Aspects 1-3, wherein the first CSI-RS port mapping, associated with the first antenna adaptation level, indicates one or more CSI-RS resources that are to be dropped relative to a second CSI-RS port mapping, associated with a second antenna adaptation level.

Aspect 5: The method of Aspect 4, wherein the one or more CSI-RS resources that are to be dropped are associated with one or more antenna ports that are not used by the base station when using the first antenna adaptation level.

Aspect 6: The method of any of Aspects 4-5, wherein the one or more CSI-RS resources that are to be dropped are associated with one or more code division multiplex (CDM) groups indicated by the second CSI-RS port mapping.

Aspect 7: The method of any of Aspects 1-6, wherein the first CSI-RS port mapping, associated with the first antenna adaptation level, indicates that signals transmitted, by the base station, via one or more antenna ports are to be repeated using time-frequency resources associated with other antenna ports as indicated by a second CSI-RS port mapping associated with a second antenna adaptation level.

Aspect 8: The method of Aspect 7, wherein the one or more antenna ports are associated with a first one or more code division multiplex (CDM) groups and the other antenna ports are associated with a second one or more CDM groups.

Aspect 9: The method of any of Aspects 7-8, wherein the first CSI-RS port mapping indicates a repetition factor associated with a quantity of repetitions of the signals transmitted, by the base station, via the one or more antenna ports.

Aspect 10: The method of Aspect 9, wherein the repetition factor is based at least in part on the first antenna adaptation level.

Aspect 11: The method of any of Aspects 9-10, wherein the first CSI-RS port mapping indicates a first mapping of time-frequency resources to initial transmissions of the signals via the one or more antenna ports and a second mapping of time-frequency resources to repeated transmissions of the signals via the one or more antenna ports.

Aspect 12: The method of any of Aspects 1-11, wherein the first CSI-RS port mapping, of the one or more CSI-RS port mappings, is associated with a first type of antenna adaptation CSI-RS port mappings; and wherein a second CSI-RS port mapping, of the one or more CSI-RS port mappings, is associated with a second type of antenna adaptation CSI-RS port mappings.

Aspect 13: The method of any of Aspects 1-12, wherein at least one CSI-RS port mapping, of the set of CSI-RS port mappings, is not associated with an antenna adaptation CSI-RS port mapping.

Aspect 14: The method of Aspect 13, wherein the at least one CSI-RS port mapping is associated with a single antenna port.

Aspect 15: The method of any of Aspects 1-14, wherein the first CSI-RS port mapping, associated with the first antenna adaptation level, indicates a mapping of antenna ports to time-frequency resource locations or to one or more code division multiplex (CDM) groups.

Aspect 16: The method of Aspect 15, wherein receiving the indication of the set of CSI-RS port mappings comprises: receiving an indication of the mapping of antenna ports to time-frequency resource locations or to one or more CDM groups for the first CSI-RS port mapping.

Aspect 17: The method of any of Aspects 15-16, wherein the mapping of antenna ports to the time-frequency resource locations or to the one or more CDM groups for the first CSI-RS port mapping, associated with the first antenna adaptation level, indicates that a single antenna port is mapped to multiple time-frequency resource locations or to multiple CDM groups.

Aspect 18: The method of any of Aspects 1-17, wherein the first CSI-RS port mapping, associated with the first antenna adaptation level, indicates a quasi co-location (QCL) relationship between a first one or more antenna ports and a second one or more antenna ports associated with the first CSI-RS port mapping.

Aspect 19: The method of any of Aspects 1-18, wherein receiving the indication of the set of CSI-RS port mappings comprises: receiving an indication of a port numbering for each of the one or more CSI-RS port mappings or for each type of antenna adaptation CSI-RS port mapping.

Aspect 20: The method of any of Aspects 1-19, further comprising: receiving an indication of the first antenna adaptation level to be used by the base station when applying antenna adaptation.

Aspect 21: The method of any of Aspects 1-20, wherein receiving the CSI-RS comprises monitoring time-frequency locations indicated by the first CSI-RS port mapping.

Aspect 22: The method of any of Aspects 1-21, further comprising measuring the CSI-RS in accordance with the first CSI-RS port mapping.

Aspect 23: The method of any of Aspects 1-22, further comprising transmitting, to the base station, a CSI measurement report indicating one or more measurements of the CSI-RS.

Aspect 24: A method of wireless communication performed by a base station, comprising: transmitting, to a user equipment (UE), an indication of a set of channel state information (CSI) reference signal (CSI-RS) port mappings for different antenna adaptation levels of the base station; and transmitting, to the UE, a CSI-RS in accordance with a first CSI-RS port mapping, from the set of CSI-RS port mappings, for a first adaptation level of the different antenna adaptation levels.

Aspect 25: The method of Aspect 24, wherein the first antenna adaptation level indicates a quantity of ports to be used by the base station to transmit the CSI-RS relative to a quantity of ports configured for use at the base station.

Aspect 26: The method of any of Aspects 24-25, wherein the set of CSI-RS port mappings includes: the first CSI-RS port mapping associated with a quantity of ports at the base station, a density, a code division multiplex (CDM) type, and the first antenna adaptation level, and a second CSI-RS port mapping associated with the quantity of ports at the base station, the density, the CDM type, and a second antenna adaptation level.

Aspect 27: The method of any of Aspects 24-26, wherein the first CSI-RS port mapping, associated with the first antenna adaptation level, indicates one or more CSI-RS resources that are to be dropped relative to a second CSI-RS port mapping, associated with a second antenna adaptation level.

Aspect 28: The method of Aspect 27, wherein the one or more CSI-RS resources that are to be dropped are associated with one or more antenna ports that are not used by the base station when using the first antenna adaptation level.

Aspect 29: The method of any of Aspects 27-28, wherein the one or more CSI-RS resources that are to be dropped are associated with one or more code division multiplex (CDM) groups indicated by the second CSI-RS port mapping.

Aspect 30: The method of any of Aspects 24-29, wherein the first CSI-RS port mapping, associated with the first antenna adaptation level, indicates that signals transmitted, by the base station, via one or more antenna ports are to be repeated using time-frequency resources associated with other antenna ports as indicated by a second CSI-RS port mapping associated with a second antenna adaptation level.

Aspect 31: The method of Aspect 30, wherein the one or more antenna ports are associated with a first one or more code division multiplex (CDM) groups and the other antenna ports are associated with a second one or more CDM groups.

Aspect 32: The method of any of Aspects 30-31, wherein the first CSI-RS port mapping indicates a repetition factor associated with a quantity of repetitions of the signals transmitted, by the base station, via the one or more antenna ports.

Aspect 33: The method of Aspect 32, wherein the repetition factor is based at least in part on the first antenna adaptation level.

Aspect 34: The method of any of Aspects 32-33, wherein the first CSI-RS port mapping indicates a first mapping of time-frequency resources to initial transmissions of the signals via the one or more antenna ports and a second mapping of time-frequency resources to repeated transmissions of the signals via the one or more antenna ports.

Aspect 35: The method of any of Aspects 24-34, wherein the first CSI-RS port mapping, of the one or more CSI-RS port mappings, is associated with a first type of antenna adaptation CSI-RS port mappings; and wherein a second CSI-RS port mapping, of the one or more CSI-RS port mappings, is associated with a second type of antenna adaptation CSI-RS port mappings.

Aspect 36: The method of any of Aspects 24-35, wherein at least one CSI-RS port mapping, of the set of CSI-RS port mappings, are not associated with an antenna adaptation CSI-RS port mapping.

Aspect 37: The method of Aspect 36, wherein the at least one CSI-RS port mapping is associated with a single antenna port.

Aspect 38: The method of any of Aspects 24-37, wherein the first CSI-RS port mapping, associated with the first antenna adaptation level, indicates a mapping of antenna ports to time-frequency resource locations or to one or more code division multiplex (CDM) groups.

Aspect 39: The method of Aspect 38, wherein transmitting the indication of the set of CSI-RS port mappings comprises: transmitting an indication of the mapping of antenna ports to time-frequency resource locations or to one or more CDM groups for the first CSI-RS port mapping.

Aspect 40: The method of any of Aspects 38-39, wherein the mapping of antenna ports to time-frequency resource locations or to one or more CDM groups for the first CSI-RS port mapping indicates that a single antenna port is mapped to multiple time-frequency resource locations or to multiple CDM groups.

Aspect 41: The method of any of Aspects 24-40, wherein the first CSI-RS port mapping, associated with the first antenna adaptation level, indicates a quasi co-location (QCL) relationship between a first one or more antenna ports and a second one or more antenna ports associated with the first CSI-RS port mapping.

Aspect 42: The method of any of Aspects 24-41, wherein transmitting the indication of the set of CSI-RS port mappings comprises: transmitting an indication of a port numbering for each of the one or more CSI-RS port mappings or for each type of antenna adaptation CSI-RS port mapping.

Aspect 43: The method of any of Aspects 24-42, further comprising: transmitting, to the UE, an indication of the first antenna adaptation level to be used by the base station when applying antenna adaptation.

Aspect 44: An apparatus for wireless communication at a device, comprising a processor; memory coupled with the processor; and instructions stored in the memory and executable by the processor to cause the apparatus to perform the method of one or more of Aspects 1-23.

Aspect 45: A device for wireless communication, comprising a memory and one or more processors coupled to the memory, the one or more processors configured to perform the method of one or more of Aspects 1-23.

Aspect 46: An apparatus for wireless communication, comprising at least one means for performing the method of one or more of Aspects 1-23.

Aspect 47: A non-transitory computer-readable medium storing code for wireless communication, the code comprising instructions executable by a processor to perform the method of one or more of Aspects 1-23.

Aspect 48: A non-transitory computer-readable medium storing a set of instructions for wireless communication, the set of instructions comprising one or more instructions that, when executed by one or more processors of a device, cause the device to perform the method of one or more of Aspects 1-23.

Aspect 49: An apparatus for wireless communication at a device, comprising a processor; memory coupled with the processor; and instructions stored in the memory and executable by the processor to cause the apparatus to perform the method of one or more of Aspects 24-43.

Aspect 50: A device for wireless communication, comprising a memory and one or more processors coupled to the memory, the one or more processors configured to perform the method of one or more of Aspects 24-43.

Aspect 51: An apparatus for wireless communication, comprising at least one means for performing the method of one or more of Aspects 24-43.

Aspect 52: A non-transitory computer-readable medium storing code for wireless communication, the code comprising instructions executable by a processor to perform the method of one or more of Aspects 24-43.

Aspect 53: A non-transitory computer-readable medium storing a set of instructions for wireless communication, the set of instructions comprising one or more instructions that, when executed by one or more processors of a device, cause the device to perform the method of one or more of Aspects 24-43.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
   receive an indication of a set of channel state information (CSI) reference signal (CSI-RS) port mappings for different antenna adaptation levels of a network entity, wherein the set of CSI-RS port mappings include a first CSI-RS port mapping for a first antenna adaptation level and a second CSI-RS port mapping for a second antenna adaptation level, and wherein:
   the first CSI-RS port mapping indicates that signals transmitted by the network entity via a first set of antenna ports are to be repeated using time-frequency resources associated with a second set of antenna ports, or
   the first CSI-RS port mapping indicates one or more CSI-RS resources that are to be dropped relative to the second CSI-RS port mapping; and
   monitor for a CSI-RS, from the network entity, in accordance with the first CSI-RS port mapping.

2. The UE of claim 1, wherein the first antenna adaptation level indicates a quantity of ports to be used by the network entity to transmit the CSI-RS relative to a quantity of ports configured for use at the network entity.

3. The UE of claim 1,
   wherein the first CSI-RS port mapping is associated with a quantity of ports at the network entity, a density, or a code division multiplex (CDM) type, and
   wherein the second CSI-RS port mapping is associated with the quantity of ports at the network entity, the density, or the CDM type.

4. The UE of claim 1, wherein the one or more CSI-RS resources that are to be dropped are associated with one or more antenna ports that are not used by the network entity when using the first antenna adaptation level.

5. The UE of claim 1, wherein the first set of antenna ports are associated with a first set of code division multiplex (CDM) groups and the second set of antenna ports are associated with a second set of CDM groups.

6. The UE of claim 1, wherein the first CSI-RS port mapping indicates a repetition factor associated with a quantity of repetitions of the signals.

7. The UE of claim 1, wherein the first CSI-RS port mapping indicates: a first mapping of a first set of resources to initial transmissions of the signals, and a second mapping of a second set of resources to repeated transmissions of the signals.

8. The UE of claim 1, wherein the first CSI-RS port mapping is associated with a first type of antenna adaptation CSI-RS port mappings; and
   wherein the second CSI-RS port mapping is associated with a second type of antenna adaptation CSI-RS port mappings.

9. The UE of claim 1, wherein the one or more processors, to monitor for the CSI-RS, are configured to monitor a set of resource locations indicated by the first CSI-RS port mapping, and
   wherein the one or more processors are further configured to:
   measure the CSI-RS in accordance with the first CSI-RS port mapping; and transmit, to the network entity, a CSI measurement report indicating one or more measurements of the CSI-RS.

10. The UE of claim 1, wherein the first CSI-RS port mapping indicates a mapping of antenna ports to a set of resource locations or to one or more code division multiplex (CDM) groups.

11. The UE of claim 1, wherein the first CSI-RS port mapping indicates a quasi co-location (QCL) relationship between a first one or more antenna ports and a second one or more antenna ports associated with the first CSI-RS port mapping.

12. The UE of claim 1, wherein the one or more processors are further configured to:
receive an indication of the first antenna adaptation level to be used by the network entity when applying antenna adaptation.

13. A method of wireless communication performed by a user equipment (UE), comprising:
receiving an indication of a set of channel state information (CSI) reference signal (CSI-RS) port mappings for different antenna adaptation levels of a network entity, wherein the set of CSI-RS port mappings include a first CSI-RS port mapping for a first antenna adaptation level and a second CSI-RS port mapping for a second antenna adaptation level, and wherein:
the first CSI-RS port mapping indicates that signals transmitted by the network entity via a first set of antenna ports are to be repeated using time-frequency resources associated with a second set of antenna ports, or
the first CSI-RS port mapping indicates one or more CSI-RS resources that are to be dropped relative to the second CSI-RS port mapping; and
monitoring for a CSI-RS, from the network entity, in accordance with the first CSI-RS port mapping.

14. The method of claim 13, wherein the first antenna adaptation level indicates a quantity of ports to be used by the network entity to transmit the CSI-RS relative to a quantity of ports configured for use at the network entity.

15. The method of claim 13,
wherein the first CSI-RS port mapping is associated with a quantity of ports at the network entity, a density, or a code division multiplex (CDM) type, and
wherein the second CSI-RS port mapping is associated with the quantity of ports at the network entity, the density, or the CDM type.

16. The method of claim 13, wherein the one or more CSI-RS resources that are to be dropped are associated with one or more antenna ports that are not used by the network entity when using the first antenna adaptation level.

17. The method of claim 13, wherein the first set of antenna ports are associated with a first set of code division multiplex (CDM) groups and the second set of antenna ports are associated with a second set of CDM groups.

18. The method of claim 13, wherein the first CSI-RS port mapping indicates a repetition factor associated with a quantity of repetitions of the signals.

19. The method of claim 18, wherein the first CSI-RS port mapping indicates; a first mapping of a first set of resources to initial transmissions of the signals, and a second mapping of a second set of resources to repeated transmissions of the signals.

20. The method of claim 13, wherein the first CSI-RS port mapping is associated with a first type of antenna adaptation CSI-RS port mappings; and wherein the second CSI-RS port mapping is associated with a second type of antenna adaptation CSI-RS port mappings.

21. The method of claim 13, wherein monitoring for the CSI-RS includes monitoring a set of resource locations indicated by the first CSI-RS port mapping, and the method further comprising:
measuring the CSI-RS in accordance with the first CSI-RS port mapping; and
transmitting, to the network entity, a CSI measurement report indicating one or more measurements of the CSI-RS.

22. The method of claim 13, wherein the first CSI-RS port mapping indicates a mapping of antenna ports to a set of resource locations or to one or more code division multiplex (CDM) groups.

23. The method of claim 13, wherein the first CSI-RS port mapping indicates a quasi co-location (QCL) relationship between a first one or more antenna ports and a second one or more antenna ports associated with the first CSI-RS port mapping.

24. The method of claim 13, further comprising:
receiving an indication of the first antenna adaptation level to be used by the network entity when applying antenna adaptation.

25. A non-transitory computer-readable medium storing a set of instructions for wireless communication, the set of instructions comprising:
one or more instructions that, when executed by one or more processors of a user equipment (UE), cause the UE to:
receive an indication of a set of channel state information (CSI) reference signal (CSI-RS) port mappings for different antenna adaptation levels of a network entity, wherein the set of CSI-RS port mappings include a first CSI-RS port mapping for a first antenna adaptation level and a second CSI-RS port mapping for a second antenna adaptation level, and wherein:
the first CSI-RS port mapping indicates that signals transmitted by the network entity via one or more antenna ports are to be repeated using time-frequency resources associated with a second set of antenna ports, or
the first CSI-RS port mapping indicates one or more CSI-RS resources that are to be dropped relative to the second CSI-RS port mapping; and
monitor for a CSI-RS, from the network entity, in accordance with the first CSI-RS port mapping.

26. The non-transitory computer-readable medium of claim 25, wherein the indication of the set of CSI-RS port mappings is received via a radio resource control configuration message.

27. The non-transitory computer-readable medium of claim 25, wherein the one or more instructions, when executed by the one or more processors of the UE, further cause the UE to:
transmit, to the network entity, a CSI report indicating one or more measurements of the monitored CSI-RS.

28. An apparatus for wireless communication, comprising:
means for receiving an indication of a set of channel state information (CSI) reference signal (CSI-RS) port mappings for different antenna adaptation levels of a network entity, wherein the set of CSI-RS port mappings include a first CSI-RS port mapping for a first antenna adaptation level and a second CSI-RS port mapping for a second antenna adaptation level, and wherein:

the first CSI-RS port mapping indicates that signals transmitted by the network entity via a first set of antenna ports are to be repeated using time-frequency resources associated with a second set of antenna ports as indicated by the second CSI-RS port mapping, or the first CSI-RS port mapping indicates one or more CSI-RS resources that are to be dropped relative to the second CSI-RS port mapping; and means for monitoring for a CSI-RS, from the network entity, in accordance with the first CSI-RS port mapping.

29. The apparatus of claim 28, wherein the indication of the set of CSI-RS port mappings is received via a radio resource control configuration message.

30. The apparatus of claim 28, further comprising:

means for transmitting, to the network entity, a CSI report indicating one or more measurements of the monitored CSI-RS.

\* \* \* \* \*